US009705548B2

(12) United States Patent
Hosoi et al.

(10) Patent No.: US 9,705,548 B2
(45) Date of Patent: Jul. 11, 2017

(54) WRISTBAND-TYPE HANDSET AND WRISTBAND-TYPE ALERTING DEVICE

(71) Applicants: Rohm Co., Ltd., Kyoto (JP); Finewell Co., Ltd., Osaka (JP)

(72) Inventors: Hiroshi Hosoi, Osaka (JP); Yoji Hosoi, Osaka (JP); Masahide Tanaka, Osaka (JP)

(73) Assignees: Rohm Co., Ltd., Kyoto (JP); Finewell Co., Ltd., Osaka (JP)

( * ) Notice: Subject to any disclaimer, the term of this patent is extended or adjusted under 35 U.S.C. 154(b) by 0 days.

(21) Appl. No.: 15/030,905

(22) PCT Filed: Oct. 20, 2014

(86) PCT No.: PCT/JP2014/077792
§ 371 (c)(1),
(2) Date: Apr. 21, 2016

(87) PCT Pub. No.: WO2015/060230
PCT Pub. Date: Apr. 30, 2015

(65) Prior Publication Data
US 2016/0261299 A1    Sep. 8, 2016

(30) Foreign Application Priority Data

Oct. 24, 2013  (JP) ................................. 2013-221303
Nov. 18, 2013  (JP) ................................. 2013-237963
Jan. 23, 2014  (JP) ................................. 2014-010271

(51) Int. Cl.
*H04B 1/3827*        (2015.01)
*G06F 1/16*          (2006.01)
(Continued)

(52) U.S. Cl.
CPC ............. *H04B 1/385* (2013.01); *G06F 1/163* (2013.01); *G06F 3/016* (2013.01); *G06F 3/167* (2013.01);
(Continued)

(58) Field of Classification Search
CPC ..................................................... H04B 1/385
See application file for complete search history.

(56) References Cited

U.S. PATENT DOCUMENTS 2,045,404 A    6/1936  Nicholides
5,295,193 A    3/1994  Ono
(Continued)

FOREIGN PATENT DOCUMENTS

CN    2198618 Y    5/1995
CN    1679371 A    10/2005
(Continued)

OTHER PUBLICATIONS

Japanese Patent Office, official communication in Japanese Patent Application No. 2012-054308 mailed on Jun. 7, 2016 (and machine translation).
(Continued)

*Primary Examiner* — Tuan H Nguyen
(74) *Attorney, Agent, or Firm* — Fish & Richardson P.C.

(57) ABSTRACT

Proposed is a bracelet-type transmission/reception device comprising: a cartilage conduction vibration source provided in a portion to be attached to a wrist; a speaker; a variable directional microphone; and a control unit which sets the directivity of the variable directional microphone to the back side of a hand when the speaker is used and sets the directivity of the variable directional microphone to the palm side of the hand when the cartilage conduction vibration source is used. The bracelet-type transmission/reception device is provided together with a display means for infor-
(Continued)

mation relating to a transmission/reception method or a handling explanation medium or advertising medium having the information relating to the transmission/reception method. An example of a method for use thereof is to conduct the vibration of the cartilage conduction vibration source to a thumb and to bring the thumb into contact with a tragus in a state where the back of the hand faces forward. The cartilage conduction vibration source is also used as a vibration source of an incoming vibrator, and when the cartilage conduction vibration source vibrates for cartilage conduction, a vibrational component in a low-frequency range that induces a sense of vibration is cut. The cartilage conduction vibration source vibrates for notification by announcement voice data in a storage unit.

17 Claims, 18 Drawing Sheets

(51) Int. Cl.
  G06F 3/01       (2006.01)
  H04M 1/725      (2006.01)
  G06F 3/16       (2006.01)
  H04R 1/02       (2006.01)
  H04R 1/32       (2006.01)
  H04R 3/00       (2006.01)
  H04W 4/00       (2009.01)
  H04W 4/06       (2009.01)
  H04W 68/00      (2009.01)

(52) U.S. Cl.
  CPC ......... *H04M 1/7253* (2013.01); *H04R 1/028* (2013.01); *H04R 1/326* (2013.01); *H04R 3/00* (2013.01); *H04W 4/008* (2013.01); *H04W 4/06* (2013.01); *H04W 68/00* (2013.01); *H04B 2001/3861* (2013.01); *H04R 2201/023* (2013.01); *H04R 2400/03* (2013.01); *H04R 2420/07* (2013.01); *H04R 2460/13* (2013.01)

(56) References Cited

U.S. PATENT DOCUMENTS

| | | |
|---|---|---|
| 5,323,468 A | 6/1994 | Bottesch |
| 6,380,923 B1 | 4/2002 | Fukumoto et al. |
| 6,456,721 B1 | 9/2002 | Fukuda |
| 6,463,157 B1 | 10/2002 | May |
| 6,950,126 B1 | 9/2005 | Homma et al. |
| 7,231,235 B2 | 6/2007 | Harrold |
| 7,437,122 B2 | 10/2008 | Choi |
| 7,442,164 B2 | 10/2008 | Berrang et al. |
| 7,555,136 B2 | 6/2009 | Wang |
| 8,521,239 B2 | 8/2013 | Hosoi et al. |
| 8,526,646 B2 | 9/2013 | Boesen |
| 8,886,263 B2 | 11/2014 | Hosoi et al. |
| 8,918,149 B2 | 12/2014 | Hosoi et al. |
| 9,020,170 B2 | 4/2015 | Hosoi et al. |
| 2001/0011951 A1 | 8/2001 | Kimata et al. |
| 2001/0026626 A1 | 10/2001 | Athanas |
| 2002/0001381 A1 | 1/2002 | Mori |
| 2002/0012441 A1 | 1/2002 | Matsunaga et al. |
| 2002/0068995 A1 | 6/2002 | Yoshida |
| 2002/0115478 A1 | 8/2002 | Fujisawa et al. |
| 2002/0149561 A1 | 10/2002 | Fukumoto et al. |
| 2002/0183014 A1 | 12/2002 | Takeda et al. |
| 2003/0108209 A1 | 6/2003 | McIntosh |
| 2003/0118197 A1 | 6/2003 | Nagayasu et al. |
| 2003/0119566 A1 | 6/2003 | Chen |
| 2004/0013279 A1 | 1/2004 | Takeda |
| 2004/0105566 A1 | 6/2004 | Matsunaga et al. |
| 2004/0131211 A1 | 7/2004 | Miyata et al. |
| 2004/0132509 A1 | 7/2004 | Glezerman |
| 2004/0189151 A1 | 9/2004 | Athanas |
| 2004/0207542 A1 | 10/2004 | Chang et al. |
| 2004/0259513 A1 | 12/2004 | Park |
| 2005/0046790 A1 | 3/2005 | Jannard et al. |
| 2005/0088530 A1 | 4/2005 | Homma et al. |
| 2005/0160270 A1 | 7/2005 | Goldberg |
| 2005/0176459 A1 | 8/2005 | Fukuda |
| 2005/0184875 A1 | 8/2005 | Schmandt et al. |
| 2005/0185813 A1 | 8/2005 | Sinclair et al. |
| 2005/0207599 A1 | 9/2005 | Fukumoto et al. |
| 2005/0213432 A1 | 9/2005 | Hoshuyama |
| 2005/0232436 A1 | 10/2005 | Nagayasu et al. |
| 2005/0244020 A1 | 11/2005 | Nakajima et al. |
| 2005/0275714 A1 | 12/2005 | Ishikawa et al. |
| 2005/0286734 A1 | 12/2005 | Wang |
| 2006/0079291 A1 | 4/2006 | Granovetter et al. |
| 2006/0093161 A1 | 5/2006 | Falcon |
| 2006/0113932 A1 | 6/2006 | Mori et al. |
| 2006/0120546 A1 | 6/2006 | Tanaka et al. |
| 2006/0121960 A1 | 6/2006 | Wang |
| 2006/0140439 A1 | 6/2006 | Nakagawa |
| 2006/0158064 A1 | 7/2006 | Asakawa et al. |
| 2006/0159297 A1 | 7/2006 | Wirola et al. |
| 2006/0171107 A1 | 8/2006 | Yamamoto et al. |
| 2006/0227984 A1 | 10/2006 | Sinclair |
| 2006/0262951 A1 | 11/2006 | Jun |
| 2006/0286998 A1 | 12/2006 | Fukuda |
| 2007/0003098 A1 | 1/2007 | Martenson |
| 2007/0015467 A1 | 1/2007 | Nagayasu et al. |
| 2007/0036370 A1 | 2/2007 | Granovetter et al. |
| 2007/0057601 A1 | 3/2007 | Kawase et al. |
| 2007/0080951 A1 | 4/2007 | Maruyama et al. |
| 2007/0081679 A1 | 4/2007 | Suzuki et al. |
| 2007/0098200 A1 | 5/2007 | Takei |
| 2007/0160253 A1 | 7/2007 | Takei et al. |
| 2007/0249395 A1 | 10/2007 | Kondo et al. |
| 2007/0263893 A1 | 11/2007 | Kim |
| 2007/0297637 A1 | 12/2007 | Sugiyama et al. |
| 2008/0008344 A1 | 1/2008 | Wakabayashi et al. |
| 2008/0054862 A1 | 3/2008 | Hara |
| 2008/0106449 A1 | 5/2008 | Doi |
| 2008/0107300 A1 | 5/2008 | Chen |
| 2008/0129703 A1 | 6/2008 | Takeshita et al. |
| 2008/0139254 A1 | 6/2008 | Levy |
| 2008/0170725 A1 | 7/2008 | Asada et al. |
| 2008/0227490 A1 | 9/2008 | Homma et al. |
| 2008/0239061 A1 | 10/2008 | Cok et al. |
| 2008/0247562 A1 | 10/2008 | Nagayasu et al. |
| 2008/0267433 A1 | 10/2008 | Katou et al. |
| 2009/0002626 A1 | 1/2009 | Wakabayashi |
| 2009/0028356 A1 | 1/2009 | Ambrose et al. |
| 2009/0129620 A1 | 5/2009 | Tagawa et al. |
| 2009/0226011 A1 | 9/2009 | Abolfathi et al. |
| 2009/0226017 A1 | 9/2009 | Abolfathi et al. |
| 2009/0226020 A1 | 9/2009 | Abolfathi et al. |
| 2009/0245557 A1 | 10/2009 | Parker |
| 2009/0288489 A1 | 11/2009 | Lee et al. |
| 2009/0290730 A1 | 11/2009 | Fukuda et al. |
| 2009/0323976 A1 | 12/2009 | Asada et al. |
| 2010/0056227 A1 | 3/2010 | Hayakawa et al. |
| 2010/0061582 A1 | 3/2010 | Takigawa et al. |
| 2010/0098269 A1 | 4/2010 | Abolfathi et al. |
| 2010/0150368 A1 | 6/2010 | Chang et al. |
| 2010/0172519 A1 | 7/2010 | Kimura et al. |
| 2010/0178957 A1 | 7/2010 | Chen |
| 2010/0184487 A1 | 7/2010 | Takada |
| 2010/0246878 A1 | 9/2010 | Sim et al. |
| 2010/0254562 A1 | 10/2010 | Koo |
| 2010/0310086 A1 | 12/2010 | Magrath et al. |
| 2010/0311462 A1 | 12/2010 | Endo et al. |
| 2010/0322127 A1 | 12/2010 | Nakajima |
| 2010/0328033 A1 | 12/2010 | Kamei |
| 2010/0329485 A1 | 12/2010 | Fukuda et al. |
| 2011/0143819 A1 | 6/2011 | Sugiyama et al. |
| 2011/0158425 A1 | 6/2011 | Hayakawa |
| 2011/0180542 A1 | 7/2011 | Drollinger et al. |
| 2011/0201301 A1 | 8/2011 | Okada et al. |
| 2011/0224481 A1 | 9/2011 | Lee et al. |
| 2011/0237306 A1 | 9/2011 | Kamii |

(56) References Cited

U.S. PATENT DOCUMENTS

| | | |
|---|---|---|
| 2011/0254616 A1 | 10/2011 | Kawano |
| 2011/0267551 A1 | 11/2011 | Yokote et al. |
| 2011/0280416 A1 | 11/2011 | Abolfathi et al. |
| 2011/0281617 A1 | 11/2011 | Kim et al. |
| 2011/0293105 A1 | 12/2011 | Arie et al. |
| 2011/0301729 A1 | 12/2011 | Heiman et al. |
| 2012/0008793 A1 | 1/2012 | Knox et al. |
| 2012/0008807 A1 | 1/2012 | Gran |
| 2012/0010735 A1 | 1/2012 | Gilboa |
| 2012/0082329 A1 | 4/2012 | Neumeyer |
| 2012/0130660 A1 | 5/2012 | Neumeyer |
| 2012/0133213 A1 | 5/2012 | Borke et al. |
| 2012/0182429 A1 | 7/2012 | Forutanpour et al. |
| 2012/0183163 A1 | 7/2012 | Apfel |
| 2012/0237075 A1 | 9/2012 | East et al. |
| 2012/0244917 A1 | 9/2012 | Hosoi et al. |
| 2012/0249223 A1 | 10/2012 | Neugebauer |
| 2012/0253236 A1* | 10/2012 | Snow ............... A61N 7/00 601/2 |
| 2012/0289162 A1 | 11/2012 | Hosoi et al. |
| 2012/0300956 A1* | 11/2012 | Horii ............... G02C 11/10 381/71.6 |
| 2013/0100596 A1 | 4/2013 | Yokote et al. |
| 2013/0111346 A1 | 5/2013 | Little |
| 2013/0136279 A1 | 5/2013 | Brown |
| 2013/0169352 A1 | 7/2013 | Kawano |
| 2013/0169829 A1 | 7/2013 | Homma et al. |
| 2013/0236043 A1 | 9/2013 | Abolfathi et al. |
| 2013/0242809 A1 | 9/2013 | Tone et al. |
| 2013/0301860 A1 | 11/2013 | Neumeyer et al. |
| 2013/0316691 A1 | 11/2013 | Forutanpour et al. |
| 2013/0322670 A1 | 12/2013 | Hosoi et al. |
| 2013/0324193 A1 | 12/2013 | Hosoi et al. |
| 2013/0336507 A1 | 12/2013 | Gran |
| 2014/0003641 A1 | 1/2014 | Neumeyer et al. |
| 2014/0342783 A1 | 11/2014 | Suzuki et al. |
| 2014/0378191 A1 | 12/2014 | Hosoi et al. |
| 2015/0054779 A1 | 2/2015 | Horii et al. |
| 2015/0065057 A1 | 3/2015 | Hosoi et al. |
| 2015/0070083 A1 | 3/2015 | Kawano |
| 2015/0078569 A1 | 3/2015 | Magrath et al. |
| 2015/0086047 A1 | 3/2015 | Horii et al. |
| 2015/0141088 A1 | 5/2015 | Hosoi et al. |
| 2015/0172588 A1 | 6/2015 | Homma et al. |
| 2015/0181338 A1 | 6/2015 | Hosoi et al. |
| 2015/0208153 A1 | 7/2015 | Hosoi et al. |
| 2015/0256946 A1 | 9/2015 | Neumeyer et al. |
| 2016/0007109 A1 | 1/2016 | Neumeyer et al. |
| 2016/0086594 A1 | 3/2016 | Asada et al. |
| 2016/0205233 A1 | 7/2016 | Hosoi et al. |
| 2016/0261299 A1 | 9/2016 | Hosoi et al. |
| 2016/0286296 A1 | 9/2016 | Hosoi et al. |
| 2017/0006144 A1 | 1/2017 | Hosoi et al. |

FOREIGN PATENT DOCUMENTS

| | | |
|---|---|---|
| CN | 1791283 | 6/2006 |
| CN | 1843019 A | 10/2006 |
| CN | 101355823 A | 1/2009 |
| CN | 101360140 | 2/2009 |
| CN | 101390440 | 3/2009 |
| CN | 201216023 | 4/2009 |
| CN | 101513081 A | 8/2009 |
| CN | 101795143 | 8/2010 |
| CN | 101897198 A | 11/2010 |
| CN | 102075633 | 5/2011 |
| EP | 1705874 A1 | 9/2006 |
| EP | 1 783 919 | 5/2007 |
| EP | 1970792 | 9/2008 |
| JP | S55-088497 | 7/1980 |
| JP | S6-17780 U | 2/1981 |
| JP | S56089086 | 7/1981 |
| JP | S8-182398 | 10/1983 |
| JP | S62-208680 | 9/1987 |
| JP | 63-115728 U | 7/1988 |
| JP | 63-142981 | 9/1988 |
| JP | H02-62199 | 3/1990 |
| JP | 3-29424 | 2/1991 |
| JP | 03117995 U | 12/1991 |
| JP | 4-90298 | 3/1992 |
| JP | H05-183618 | 7/1993 |
| JP | H05-292167 | 11/1993 |
| JP | 06-030494 | 2/1994 |
| JP | 07-107146 | 4/1995 |
| JP | 07-131268 A | 5/1995 |
| JP | H7-039150 U | 7/1995 |
| JP | 08-033026 A | 2/1996 |
| JP | 8-102780 | 4/1996 |
| JP | 08-237185 A | 9/1996 |
| JP | H10-042021 | 2/1998 |
| JP | 3050147 | 4/1998 |
| JP | 10-136480 | 5/1998 |
| JP | 10-227 U | 9/1998 |
| JP | H11112672 | 4/1999 |
| JP | H11-163980 A | 6/1999 |
| JP | 11-298595 | 10/1999 |
| JP | 11-352138 | 12/1999 |
| JP | 2000-013294 | 1/2000 |
| JP | 2000-49935 | 2/2000 |
| JP | 3070222 U | 4/2000 |
| JP | 2000/217015 A | 8/2000 |
| JP | 2000-324217 | 11/2000 |
| JP | 2001-177809 | 6/2001 |
| JP | 2001-268211 | 9/2001 |
| JP | 2001287183 | 10/2001 |
| JP | 2001-320790 | 11/2001 |
| JP | 2001-333161 A | 11/2001 |
| JP | 2001-339504 | 12/2001 |
| JP | 2001-352395 | 12/2001 |
| JP | 2002-016720 | 1/2002 |
| JP | 2002036158 | 2/2002 |
| JP | 2002041411 | 2/2002 |
| JP | 2002051111 | 2/2002 |
| JP | 2002-84575 | 3/2002 |
| JP | 2002-111822 A | 4/2002 |
| JP | 2002-149312 | 5/2002 |
| JP | 2002-164986 A | 6/2002 |
| JP | 2002-171321 A | 6/2002 |
| JP | 2002-238262 A | 8/2002 |
| JP | 2002-262377 | 9/2002 |
| JP | 2002-359889 A | 12/2002 |
| JP | 2003-037651 | 2/2003 |
| JP | 2003-103220 A | 4/2003 |
| JP | 2003-111175 A | 4/2003 |
| JP | 2003-125473 A | 4/2003 |
| JP | 2003-143253 | 5/2003 |
| JP | 2003-145048 | 5/2003 |
| JP | 2003-169115 | 6/2003 |
| JP | 2003-173375 A | 6/2003 |
| JP | 2003-179988 | 6/2003 |
| JP | 2003-188985 | 7/2003 |
| JP | 2003-211087 | 7/2003 |
| JP | 2003-218989 | 7/2003 |
| JP | 2003198719 | 7/2003 |
| JP | 2003274376 | 9/2003 |
| JP | 2003-319022 | 11/2003 |
| JP | 2003-348208 | 12/2003 |
| JP | 2004-094389 | 3/2004 |
| JP | 2004-128915 | 4/2004 |
| JP | 2004-158961 A | 6/2004 |
| JP | 2004-173018 A | 6/2004 |
| JP | 2004-173264 | 6/2004 |
| JP | 2004-187031 | 7/2004 |
| JP | 2004-205839 | 7/2004 |
| JP | 2004-266321 A | 9/2004 |
| JP | 2004-274438 | 9/2004 |
| JP | 2004-357198 | 12/2004 |
| JP | 2005-020730 | 1/2005 |
| JP | 2005-512440 A | 4/2005 |
| JP | 2005-142835 | 6/2005 |
| JP | 2005-159969 | 6/2005 |
| JP | 2005184267 | 7/2005 |
| JP | 2005-223717 A | 8/2005 |

(56) References Cited

FOREIGN PATENT DOCUMENTS

| | | |
|---|---|---|
| JP | 2005-229324 | 8/2005 |
| JP | 2005-237026 | 9/2005 |
| JP | 2005-244968 | 9/2005 |
| JP | 2005-328125 A | 11/2005 |
| JP | 2005-534269 | 11/2005 |
| JP | 2005-341543 | 12/2005 |
| JP | 2005-348193 | 12/2005 |
| JP | 2005-352024 | 12/2005 |
| JP | 2006-007919 | 1/2006 |
| JP | 2006-011591 A | 1/2006 |
| JP | 2006007342 | 1/2006 |
| JP | 2006-050056 A | 2/2006 |
| JP | 2006-066972 A | 3/2006 |
| JP | 2006-067049 | 3/2006 |
| JP | 2006-074671 A | 3/2006 |
| JP | 2006-086581 | 3/2006 |
| JP | 2006-109326 | 4/2006 |
| JP | 2006-115060 | 4/2006 |
| JP | 2006-115476 | 4/2006 |
| JP | 2006-129117 | 5/2006 |
| JP | 2006-148295 | 6/2006 |
| JP | 2006-165702 | 6/2006 |
| JP | 2006-166128 | 6/2006 |
| JP | 2006-166300 | 6/2006 |
| JP | 2006/186691 A | 7/2006 |
| JP | 2006-197404 | 7/2006 |
| JP | 2006-211317 | 8/2006 |
| JP | 2006-226506 | 8/2006 |
| JP | 2006-229647 A | 8/2006 |
| JP | 2006217321 | 8/2006 |
| JP | 2006-238072 | 9/2006 |
| JP | 2006283541 | 10/2006 |
| JP | 2006-333058 | 12/2006 |
| JP | 2006-345025 A | 12/2006 |
| JP | 2006-345471 | 12/2006 |
| JP | 2006339914 | 12/2006 |
| JP | 2007-003702 | 1/2007 |
| JP | 2007-006369 | 1/2007 |
| JP | 2007/010518 | 1/2007 |
| JP | 2007-019898 | 1/2007 |
| JP | 2007-028469 | 2/2007 |
| JP | 2007-051395 A | 3/2007 |
| JP | 2007-081276 | 3/2007 |
| JP | 2007074663 | 3/2007 |
| JP | 2007-103989 | 4/2007 |
| JP | 2007-104548 | 4/2007 |
| JP | 2007-104603 A | 4/2007 |
| JP | 2007-129740 A | 5/2007 |
| JP | 2007-133698 | 5/2007 |
| JP | 2007-142920 | 6/2007 |
| JP | 2007-165938 | 6/2007 |
| JP | 2007-180827 | 7/2007 |
| JP | 2007-189578 | 7/2007 |
| JP | 2007-195239 | 8/2007 |
| JP | 2007-214883 | 8/2007 |
| JP | 2007-228508 | 9/2007 |
| JP | 2007-268028 A | 10/2007 |
| JP | 2007-275819 | 10/2007 |
| JP | 2007-330560 A | 12/2007 |
| JP | 2007-336418 | 12/2007 |
| JP | 2008-017327 | 1/2008 |
| JP | 2008-017398 | 1/2008 |
| JP | 2008006558 | 1/2008 |
| JP | 2008-042324 A | 2/2008 |
| JP | 2008-046844 | 2/2008 |
| JP | 2008-092164 | 4/2008 |
| JP | 2008-092313 | 4/2008 |
| JP | 2008-511217 | 4/2008 |
| JP | 2008085417 | 4/2008 |
| JP | 2008-121796 | 5/2008 |
| JP | 2008-135991 | 6/2008 |
| JP | 2008-141589 | 6/2008 |
| JP | 2008-141687 | 6/2008 |
| JP | 2008-148086 | 6/2008 |
| JP | 2008-177705 | 7/2008 |
| JP | 2008149427 | 7/2008 |
| JP | 2008177629 | 7/2008 |
| JP | 3144392 U | 8/2008 |
| JP | 2008-227806 | 9/2008 |
| JP | 2008-263383 | 10/2008 |
| JP | 2009010593 | 1/2009 |
| JP | 2009-044510 | 2/2009 |
| JP | 2009-094986 A | 4/2009 |
| JP | 2009-117953 | 5/2009 |
| JP | 2009-118396 | 5/2009 |
| JP | 2009-147680 | 7/2009 |
| JP | 2009-159402 | 7/2009 |
| JP | 2009-159577 | 7/2009 |
| JP | 2009166213 | 7/2009 |
| JP | 4307488 | 8/2009 |
| JP | 2009-207056 | 10/2009 |
| JP | 2009-232443 | 10/2009 |
| JP | 2009-246954 | 10/2009 |
| JP | 2009-260883 | 11/2009 |
| JP | 2010-010945 A | 1/2010 |
| JP | 2010011117 | 1/2010 |
| JP | 2010-068299 | 3/2010 |
| JP | 2010054731 | 3/2010 |
| JP | 2010-094799 | 4/2010 |
| JP | 2010087810 | 4/2010 |
| JP | 2010-166406 | 7/2010 |
| JP | 2010-524295 | 7/2010 |
| JP | 4541111 | 7/2010 |
| JP | 2010-528547 | 8/2010 |
| JP | 2010207963 | 9/2010 |
| JP | 2010232755 | 10/2010 |
| JP | 2010-258701 | 11/2010 |
| JP | 2010-268336 | 11/2010 |
| JP | 2010283541 | 12/2010 |
| JP | 2011-004195 A | 1/2011 |
| JP | 2011-008503 A | 1/2011 |
| JP | 2011-010791 A | 1/2011 |
| JP | 2011-035560 A | 2/2011 |
| JP | 2011-048697 | 3/2011 |
| JP | 2011-087142 A | 4/2011 |
| JP | 2011-512745 | 4/2011 |
| JP | 2011-130334 | 6/2011 |
| JP | 2011-139462 | 7/2011 |
| JP | 2011135489 | 7/2011 |
| JP | 2011-212167 A | 10/2011 |
| JP | 2011-223556 | 11/2011 |
| JP | 2011-223824 A | 11/2011 |
| JP | 2011-233971 | 11/2011 |
| JP | 2011-234323 A | 11/2011 |
| JP | 2012-508499 A | 4/2012 |
| JP | 2012-109663 | 6/2012 |
| JP | 2012-138770 | 7/2012 |
| JP | 2012-515574 A | 7/2012 |
| JP | 2012-169817 | 9/2012 |
| JP | 2012-178695 A | 9/2012 |
| JP | 2012-257072 | 12/2012 |
| JP | 2013-005212 | 1/2013 |
| JP | 2013-055492 A | 3/2013 |
| JP | 2013061176 | 4/2013 |
| JP | 2013-081047 A | 5/2013 |
| JP | 2013-128896 A | 7/2013 |
| JP | 2013-198072 A | 9/2013 |
| JP | 2013-235316 A | 11/2013 |
| JP | 2013255091 | 12/2013 |
| JP | 2013255212 | 12/2013 |
| JP | 2014003488 | 1/2014 |
| JP | 2014-089494 A | 5/2014 |
| JP | 2014-116972 | 6/2014 |
| JP | 2014190965 | 10/2014 |
| JP | 2014-229991 A | 12/2014 |
| JP | 5676003 | 2/2015 |
| JP | 2015082818 | 4/2015 |
| JP | 2015084801 | 5/2015 |
| KR | 10-1998-0022845 | 6/1998 |
| KR | 10-2005-0086378 | 8/2005 |
| KR | 10-2007-0109323 | 11/2007 |
| KR | 10-2008-0006514 | 1/2008 |
| KR | 10-2008-0009602 | 1/2008 |
| KR | 10-2008-0040962 | 5/2008 |

(56) References Cited

FOREIGN PATENT DOCUMENTS

| | | |
|---|---|---|
| KR | 10-2009-0033564 | 4/2009 |
| KR | 10-2009-0120951 | 11/2009 |
| KR | 10-2010-0034906 A | 4/2010 |
| KR | 10-2010-0041386 A | 4/2010 |
| TW | 200423682 | 11/2004 |
| TW | 200536415 A | 11/2005 |
| TW | 200539664 A | 12/2005 |
| TW | 200912814 | 3/2009 |
| TW | 200922261 A | 5/2009 |
| TW | 201018982 | 5/2010 |
| TW | M452360 U | 5/2013 |
| TW | 201342313 | 10/2013 |
| WO | 2003/055183 | 7/2003 |
| WO | 2004034734 | 4/2004 |
| WO | 2005/067339 | 7/2005 |
| WO | 2005-069586 | 7/2005 |
| WO | 2005/091670 | 9/2005 |
| WO | 2005/096599 | 10/2005 |
| WO | 2005/096664 | 10/2005 |
| WO | 2006/006313 A1 | 1/2006 |
| WO | 2006-021133 | 3/2006 |
| WO | 2006/028045 A1 | 3/2006 |
| WO | 2006/075440 | 7/2006 |
| WO | 2007/034739 | 3/2007 |
| WO | 2007-099707 | 9/2007 |
| WO | 2008-007666 | 1/2008 |
| WO | 2008/029515 | 3/2008 |
| WO | 2009/104437 | 8/2009 |
| WO | 2009/133873 | 11/2009 |
| WO | 2009/136498 | 11/2009 |
| WO | 2009141912 | 11/2009 |
| WO | 2010-005045 | 1/2010 |
| WO | 2010/050154 | 5/2010 |
| WO | 2010/060323 | 6/2010 |
| WO | 2010/116510 | 10/2010 |
| WO | 2011/007679 | 1/2011 |
| WO | 2011/023672 A1 | 3/2011 |
| WO | 2011/090944 | 7/2011 |
| WO | 2011/159349 | 12/2011 |
| WO | 2012/090947 | 7/2012 |
| WO | 2012097314 | 7/2012 |
| WO | 2013/047609 | 4/2013 |
| WO | 2013/168628 | 11/2013 |
| WO | 2014156534 | 10/2014 |
| WO | 2015122879 | 8/2015 |

OTHER PUBLICATIONS

Japanese Patent Office, official communication in Japanese Patent Application No. 2015-056466 mailed on Jul. 12, 2016 (and machine translation).
Japanese Patent Office, official communication in Japanese Patent Application No. 2015-217427 mailed on Jul. 19, 2016 (and machine translation).
Japanese Patent Office, official communication in Japanese Patent Application No. 2015-217421 mailed on Jul. 19, 2016 (and machine translation).
SIPO of People's Republic of China, official communication for Chinese Patent Application No. 201180031904.5 mailed on Jul. 20, 2016 (and machine translation).
Japanese Patent Office, official communication in Japanese Patent Application No. 2012-120173 mailed on Jul. 26, 2016 (and machine translation).
Japanese Patent Office, official communication in Japanese Patent Application No. 2015-048052 mailed on Aug. 2, 2016 (and machine translation).
Japanese Patent Office, official communication in Japanese Patent Application No. 2012-147753 mailed on Aug. 23, 2016 (and machine translation).
Japanese Patent Office, official communication in Japanese Patent Application No. 2015-231478 mailed on Aug. 30, 2016 (and machine translation).
News Release, "New Offer of Smartphone Using Cartilage Conduction", Rohm Semiconductor, Kyoto, Japan, Apr. 23, 2012 (with translation).
Japan Patent Office, International Search Report for PCT/JP2013/067781 dated Oct. 1, 2013 (with English translation).
Japan Patent Office, International Search Report for International Patent Application PCT/JP2012/066376 (Oct. 30, 2012).
International Search Report for International Patent Application PCT/JP2011/080095 (dated Apr. 3, 2012).
Taiwanese Patent Office, search report in application 100148983 (2 pages) (Jan. 17, 2013).
U.S. Patent and Trademark Office, Office Action in U.S. Appl. No. 13/556,367 (Oct. 19, 2012).
European Patent Office, official communication in Application No. EP 11 85 3718 (May 14, 2014).
U.S. Patent and Trademark Office, Office Action in U.S. Appl. No. 13/489,971 (Oct. 24, 2012).
Isaka et al., "Development of Bone Conduction Speaker by Using Piezoelectric Vibration," The JP Society of Mechanical Engineers (No. 04-5) Dynamics and Design Conference 2004 CD-ROM Compilation (Sep. 27-30, 2004; Tokyo) (and English translation).
Japan Patent Office, International Search Report for International Patent Application PCT/JP2012/053231 (Mar. 13, 2012).
Extended European Search Report in European patent application No. 12866397.8 (mailed on Jul. 20, 2015).
Japan Patent Office, International Search Report for PCT/JP2014/071607 dated Nov. 11, 2014 (with English translation).
Japan Patent Office, International Search Report for PCT/JP2014/077792 dated Dec. 16, 2014 (with English translation).
Extended European Search Report for PCTJP2013067781 dated Feb. 19, 2016.
Japan Patent Office, International Search Report for PCT/JP2015/071490 dated Nov. 2, 2015 with English translation.
European Patent Office, Partial Search Report for EP 11 85 3443 dated Oct. 27, 2016.
Smartphone Black Berry Bold 9700, Operation guide (2010).
Office Action for JP Patent Application No. 2016-013411 mailed on Nov. 22, 2016 with English Translation.
Office Action for KR Patent Application No. 10-2016-7004740 mailed on Nov. 28, 2016 with English Translation.
Office Action for JP Patent Application No. 2012-252203 mailed on Dec. 20, 2016 with English Translation.
Office Action for JP Patent Application No. 2012-243480 mailed on Dec. 20, 2016 with English Translation.
Office Action for JP Patent Application No. 2012-229176 mailed on Dec. 27, 2016 with English Translation.
Office Action for JP Patent Application No. 2012-268649 mailed on Jan. 31, 2017 with English Translation.
Office Action for JP Patent Application No. 2012-054308 mailed on Feb. 7, 2017 with English Translation.
Final Office Action for JP Patent Application No. 2012-120173 mailed on Feb. 7, 2017 with English translation.
U.S. Patent and Trademark Office, Office Action in U.S. Appl. No. 15/049,403 dated Nov. 23, 2016.
U.S. Patent and Trademark Office, Office Action in U.S. Appl. No. 15/174,746 dated Nov. 25, 2016.

* cited by examiner

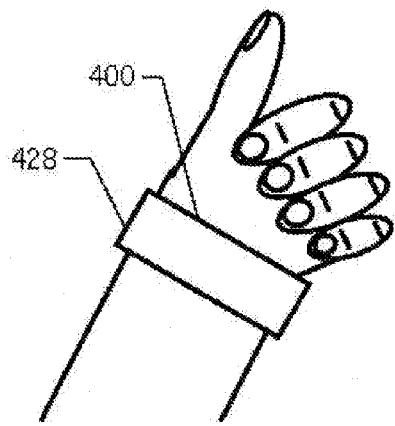
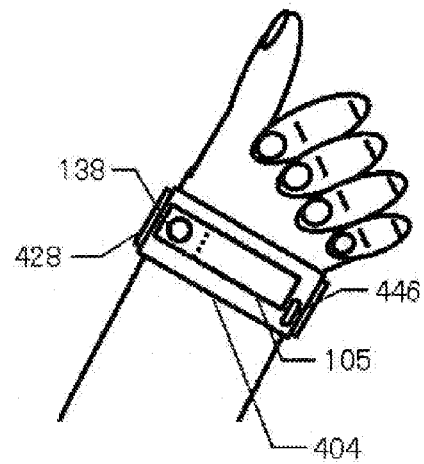
FIG.12A  FIG.12B
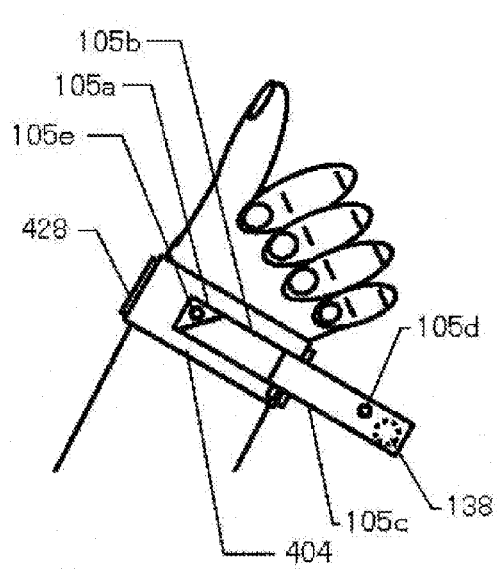
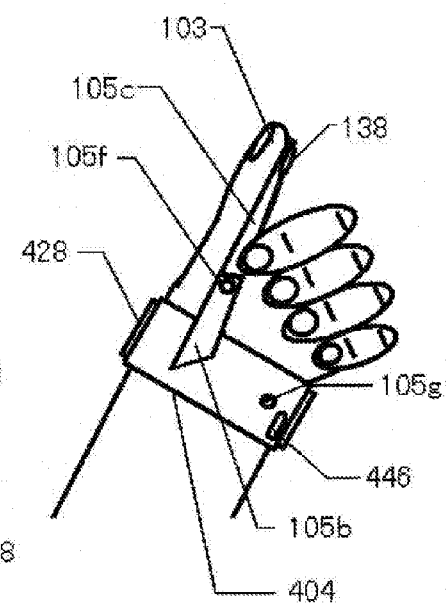
FIG.12C  FIG.12D

WRISTBAND-TYPE HANDSET AND WRISTBAND-TYPE ALERTING DEVICE

TECHNICAL FIELD

The present invention relates to wristband-type handsets and wristband-type alerting devices.

BACKGROUND ART

Patent Document 1 proposes, as a method for using a bone-conduction speaker having a vibrating surface to be put on the tragus, adjusting by manual operation the pressure with which the vibrating surface is put on the tragus in order to adjust the proportions of cartilage-conducted sound information and air-conducted sound information according to the level of ambient noise (Patent Document 1). Patent Document 2 proposes conducting vibration generated by an actuator from a diaphragm to the human body, then conducting the vibration of the diaphragm from the wrist to a finger by bone conduction, and then putting the finger into the ear canal or the like so that an audio signal can be heard (Patent Document 2). In Patent Document 3, the present inventors propose converting, via a ring worn on a user's finger, an audio signal into cartilage-conducted vibration, which is then conducted to the finger. In this way, the audio signal in the form of vibration of the finger conducts, as cartilage-conducted sound, to the cartilage around the ear canal, producing air-conducted sound inside the ear canal so as to conduct to the eardrum, and partly conducting directly to the inner ear via the cartilage (Patent Document 3). Patent Document 4 proposes taking out a wrist watch attachment connected to a cable wound up on a cord reel inside a wrist watch-type mobile telephone, wearing the attachment on a fingertip, and putting the fingertip into the earhole so that vibration of a vibration-conducting device fitted to the wrist watch attachment is conducted directly to the ear (Patent Document 4). Patent Document 5 proposes, as an alerting device, an incoming-call sensing accessory for a mobile telephone in which a vibration-generating device that vibrates on detecting an incoming-call signal is built into an ornamental accessory such as a wristband (Patent Document 5).

LIST OF CITATIONS

Patent Literature

[Patent Document 1] Japanese Patent No. 4541111
[Patent Document 2] Japanese Patent Application Publication No. 2002-111822
[Patent Document 3] Japanese Patent Application Publication No. 2012-178695
[Patent Document 4] Japanese Patent Application Publication No. 2000-324217
[Patent Document 5] Japanese Patent Application Publication No. H11-163980

SUMMARY OF THE INVENTION

Technical Problem

However, with respect to handsets that achieve cartilage conduction via vibration of a hand, there still remain many issues to be addressed. With respect to speech-receiving methods and handsets that achieve cartilage conduction, there still remain many issues to be addressed. With respect to alerting devices, there still remains many issues to be addressed.

Against the background discussed above, one object of the present invention is to provide more effective handsets that achieve cartilage conduction via vibration of a hand, and another object of the present invention is to provide effective alerting devices for mobile telephones.

Means for Solving the Problem

According to one feature of the present invention, a wristband-type handset includes: a worn part worn on a wrist; a cartilage conduction vibration source provided in the worn part; a speaker; a variable-directivity microphone; and a controller for switching the directivity of the variable-directivity microphone according to which of the cartilage conduction vibration source and the speaker is used. Specifically, the wristband-type handset is configured as a wrist watch, a bracelet, a wristband, or the like. According to a specific feature, the controller directs the directivity of the variable-directivity microphone toward the back of a hand when the speaker is used, and directs the directivity of the variable-directivity microphone toward the palm of a hand when the cartilage conduction vibration source is used.

According to another specific feature, the wristband-type handset is offered along with explanatory information explaining a method of use involving putting the hand on which the worn part is worn in contact with an ear cartilage. According to a more specific feature, the explanatory information is offered by a means for displaying information on a speech-transmitting and -receiving method. The explanatory information may instead be offered in the form of an instruction manual medium containing information on a speech-transmitting and -receiving method. The explanatory information may instead be offered in the form of an advertisement medium containing information on a speech-transmitting and -receiving method.

In one example of a method of use according to a specific feature, vibration of the cartilage conduction vibration source is conducted to a thumb, and, with the back of the hand pointing frontward, the thumb is put in contact with a tragus to conduct the vibration of the cartilage conduction vibration source further to the tragus so that sound is heard by cartilage conduction.

According to another feature, a wristband-type handset includes: a worn part worn on a wrist; and a cartilage conduction vibration source provided in the worn part to produce vibration in an audible frequency range. The cartilage conduction vibration source is used also as a vibration source for an incoming-call vibrator. When the cartilage conduction vibration source is vibrated for cartilage conduction, the vibration component in a low frequency range arousing the sense of vibration is cut off.

According to a specific feature, when the cartilage conduction vibration source is vibrated for the incoming-call vibrator, the vibration component in the audible frequency range is cut off. According to another specific feature, there is provided a limiter for inhibiting vibration exceeding an intensity low enough not to arouse the sense of vibration when the cartilage conduction vibration source is vibrated for cartilage conduction.

According to another feature, a wristband-type alerting device includes: a storage for previously storing a plurality of pieces of alert audio data; a vibration source for vibrating for cartilage conduction; a near-field communicator for receiving an instruction signal from a mobile telephone; and a controller for selecting, according to the instruction signal received by the near-field communicator, a corresponding piece of alert audio data stored in the storage, and for making the vibration source vibrate in a frequency range of an audio signal for cartilage conduction according to the selected piece of alert audio data. According to another specific feature, the wristband-type alerting device is controlled by the controller so as to produce alert vibration in a frequency range arousing the sense of vibration according to the instruction signal received by the near-field communicator.

According to a specific feature, the wristband-type alerting device first produces alert vibration in the frequency range arousing the sense of vibration according to the instruction signal received by the near-field communicator, and then switches to vibration by the vibration source based on the audio data in the frequency range of an audio signal in order to allow the user to confirm the cause of the alert vibration. According to a more specific feature, the instruction signal contains information indicating that the battery of the mobile telephone is low, and the audio data contains an announcement indicating that the battery of the mobile telephone is low. According to another specific feature, the instruction signal contains information indicating that the mobile telephone is located outside the telephone service area, and the audio data contains an announcement indicating that the mobile telephone is located outside the telephone service area.

Advantageous Effects of the Invention

According to the present invention, it is possible to provide more effective handsets that achieve cartilage conduction via vibration of a hand, and to provide effective alerting devices.

BRIEF DESCRIPTION OF DRAWINGS

FIG. 12 comprises exterior views of a wrist watch attachment-type handset, in a worn state, according to a fifth embodiment (Embodiment 5) of the present invention;

DESCRIPTION OF EMBODIMENTS

Embodiment 1

Figure 1:
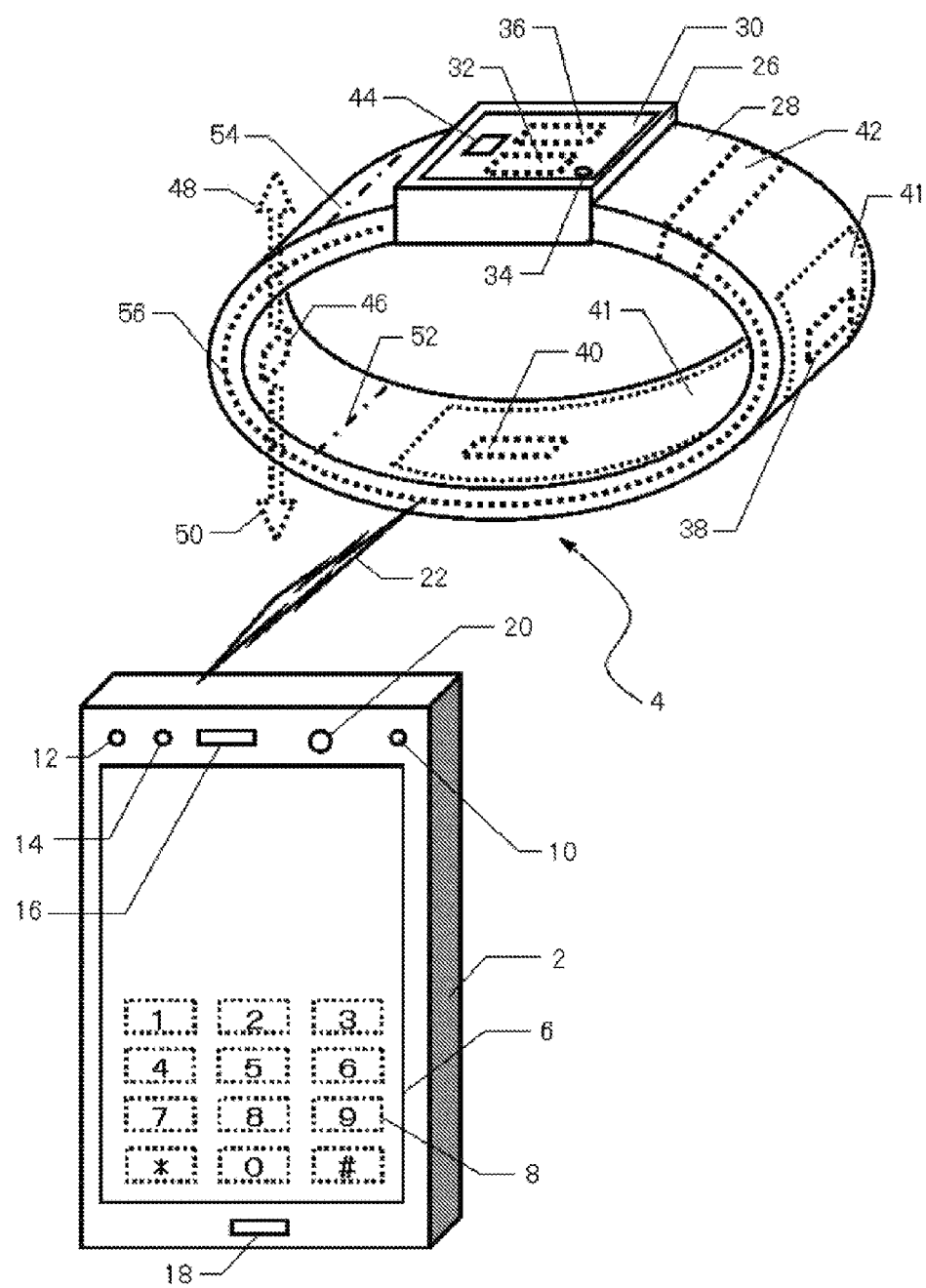
FIG. 1 is a perspective view showing a system configuration of a first embodiment (Embodiment 1) of the present invention.

FIG. 1 is a perspective view showing a system configuration according to a first embodiment, Embodiment 1, of the present invention. Embodiment 1 is configured as a system comprising a mobile telephone 2 and a wrist watch-type handset 4. The mobile telephone 2 is configured as a so-called smartphone having a display 6 with GUI (graphical user interface) capabilities. An operation panel 8 including a numeric keypad is displayed on the display 6, and is operated on a GUI basis through touching and sliding operations on the display 6 with a finger. An infrared light emitter 12 and an infrared light receiver 14 constitute a proximity sensor for detecting the mobile telephone 2 being put on the ear. The mobile telephone 2 further includes an earphone 16, a microphone 18, and a front videophone camera 20. The mobile telephone 2 also includes a rear main camera, though not illustrated in FIG. 1, behind the display 6, and can communicate with the wrist watch-type handset 4 by near-field communication (NFC) using a radio wave 22 of a near-field communication system such as Bluetooth (a registered trademark). The mobile telephone 2 further includes a speaker for sounding ringtones and for delivering videophone sound, and for distinction from it, the other speaker on which the ear is put is referred to as the "earphone 16" as mentioned above.

The wrist watch-type handset 4 has a wrist watch body 26 and a belt 28. The wrist watch body 26 is provided with a watch display 30 comprising a reflective liquid crystal display device, and provides ordinary time display as well as various other kinds of display as will be described later. The watch display 30, of a touch panel-type, has a touch panel 30a on its display surface, and allows the user to operate the wrist watch-type handset 4. The wrist watch body 26 is provided with a handset speaker 32, and communicates with the mobile telephone 2 by near-field communication to allow the user to engage in a telephone call while viewing the wrist watch-type handset 4 even with the mobile telephone 2 stuck in, for example, a picket. A handset microphone will be described later. The wrist watch body 26 is further provided with a camera 34, which shoots the face of the user him or herself viewing the watch display 30 while the face of the person at the other side is displayed on the watch display 30, allowing the user to engage in a videophone call.

The wrist watch body 26 is provided with a cartilage conduction vibration source 36 comprising a piezoelectric bimorph element or the like, so that vibration for cartilage conduction is conducted from the reverse side of the wrist watch body 26 to the wrist. Likewise, the belt 28 too is provided with cartilage conduction vibration sources 38 and 40 each comprising a piezoelectric bimorph element or the like, so that vibration for cartilage conduction is conducted from the reverse side of the belt 28 to the wrist. The belt 28 is also provided with a conducting segment 41, which is formed of a material having an acoustic impedance close to that of the wrist, and the cartilage conduction vibration sources 38 and 40 are arranged on or in the conducting segment 41, so that their vibration conducts via the conducting segment 41. Thus, from the wrist watch-type handset 4, vibration for cartilage conduction is conducted over a large area around the wrist. A configuration like this, in which vibration is conducted from around the wrist over a large area, is effective in absorbing differences in the position suitable for vibration conduction among individual users, displacements of the wrist watch-type handset 4 while it is being worn, and so forth. Conducting vibration from around the wrist over a large area also helps conduct vibration for cartilage conduction to the arm more effectively.

Now, cartilage conduction will be explained. Cartilage conduction is a phenomenon discovered by the present inventors, and denotes the phenomenon in which vibration conducted to the cartilage around the entrance of the ear canal, such as that in the tragus, makes the surface of the cartilage part of the ear canal vibrate, producing air-conducted sound inside the ear canal. The air-conducted sound produced inside the ear canal travels on deeper into it to reach the eardrum. Thus, the greater part of the sound heard by cartilage conduction is the sound heard via the eardrum. However, here, the sound heard via the eardrum is not ordinary air-conducted sound, i.e., sound that has entered the ear canal from outside it, but air-conducted sound that is produced inside the ear canal.

The cartilage conduction vibration sources double as a vibration source for an incoming-call vibrator, and serve to notify an incoming call by conducting vibration to the wrist by vibrating when fed with an incoming call signal by near-field communication with the mobile telephone 2. As will be described later, for cartilage conduction, the cartilage conduction vibration sources are vibrated in a frequency range of an audio signal (frequencies around 1000 Hz), and the vibration is conducted to the wrist with a frequency range that arouses the sense of vibration (e.g., 20 Hz or less) cut off so that no uncomfortable vibration may be sensed at the wrist. On the other hand, when vibrated as an incoming-call vibrator, the cartilage conduction vibration sources are vibrated around a frequency that arouses the sense of vibration (e.g., 20 Hz or less), with an audible frequency range cut off so that the vibration may not be heard by someone around.

The belt 28 is provided with a tightening mechanism 42, which allows the user to loosen the belt 28 when wearing or removing the wrist watch-type handset 4, and to tighten the belt 28 to keep the wrist watch-type handset 4 in a normal worn state. With the tightening mechanism 42, the user can tighten the belt 28 further from the normal state within a range in which the user does not feel pain or discomfort to more reliably obtain cartilage conduction to the wrist. Such switching from the normal state to the cartilage conduction state by the tightening mechanism 42 can be made to take place by the user making a touch panel operation, pressing a switch 44 displayed on the watch display 30. The user's action to press the switch 44 involves pressing the wrist watch body 26 onto the wrist, and thus serves as an action to bring the vibration of the cartilage conduction vibration source 36 in closer contact with the wrist. Needless to say, so long as sufficient cartilage conduction is obtained in the normal worn state, the user can conduct a call without pressing the switch 44.

The belt 28 is further provided with a variable-directivity microphone 46 for the handset. In the videophone mode mentioned above, as indicated by an arrow 48, the directivity of the variable-directivity microphone 46 is directed toward the back of the hand, so as to collect sound from in front of the watch display 30. On the other hand, during a telephone call using cartilage conduction, as indicated by an arrow 50, the directivity of the variable-directivity microphone 46 is so switched as to collect sound from the direction of the palm of the hand (typically the left hand) on which the wrist watch-type handset 4 is worn. This permits the user to conduct a telephone call in a posture as will be described later. The belt 28 is provided with vibration-isolating segments 52 and 54, which are formed of a material having a different acoustic impedance than mentioned above, so that vibration from the cartilage conduction vibration sources 36, 38, and 40 may not conduct to the variable-directivity microphone 46. Along the belt 28, an antenna 56 is provided so as to be wound around the wrist.

Figure 2A:
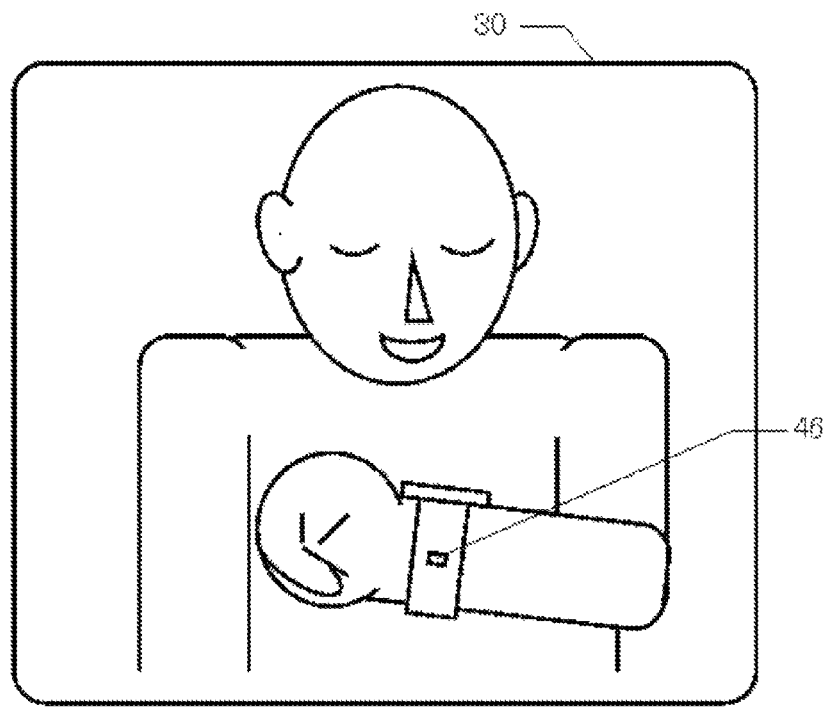
FIG. 2 is a diagram showing screens displayed on a watch display to explain call-conducting postures in Embodiment 1.

FIG. 2 is a diagram showing screens displayed on the watch display 30 to explain call-conducting postures in Embodiment 1 shown in FIG. 1. These screens are displayed each time the power switch of the wrist watch-type handset 4 is turned ON, but if that is annoying, a setting is also possible to skip those screens. FIG. 2(A) shows a screen explaining a call-conducting posture for a videophone call, in which posture the user conducts a videophone call while viewing the watch display 30 with the mobile telephone 2 placed in, for example, a pocket. In this posture, the directivity of the variable-directivity microphone 46 is directed toward the back of the hand as indicated by the arrow 48 in FIG. 1.

Figure 2B:
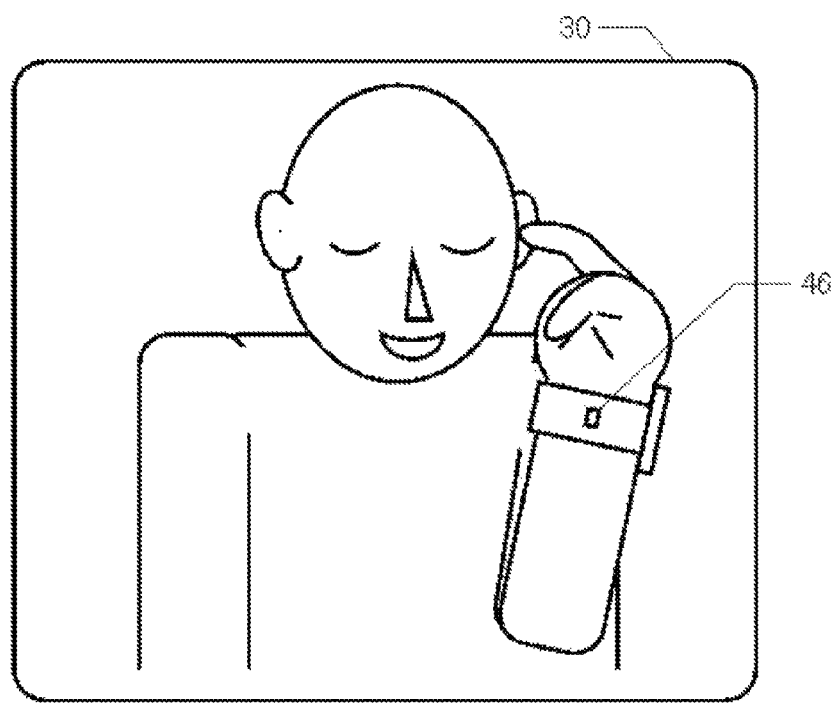

FIG. 2(B) shows a screen explaining a posture for a cartilage-conduction call, in which posture the user conducts a telephone call with the forefinger of the hand (e.g., the left hand) on which the wrist watch-type handset 4 is worn put on the tragus (ear cartilage) of the ear (e.g., the left ear) on the same side. In this posture, so long as the finger does not close the earhole, the user can hear cartilage-conducted sound while also hearing outside sound. Incidentally, by pressing the tragus so hard as to close the earhole, the user can hear cartilage-conducted sound louder due to a closed ear canal effect. In this call-conducting posture, the vibration for cartilage conduction that is introduced at the wrist conducts to the forefinger, whose vibration then conducts to the tragus (ear cartilage). The user can thus hear the other side's voice well by cartilage conduction, while the user's own voice is conveyed to the other side by being collected by the variable-directivity microphone 46 which has its directivity directed toward the palm of the hand as indicated by the arrow 50 in FIG. 1. In this posture, the camera 34, the handset speaker 32, and the watch display 30 are kept OFF. These are automatically turned OFF in response to an acceleration sensor provided in the wrist watch body 26 detecting a change in posture from FIG. 2(A) to FIG. 2(B).

Figure 3A:
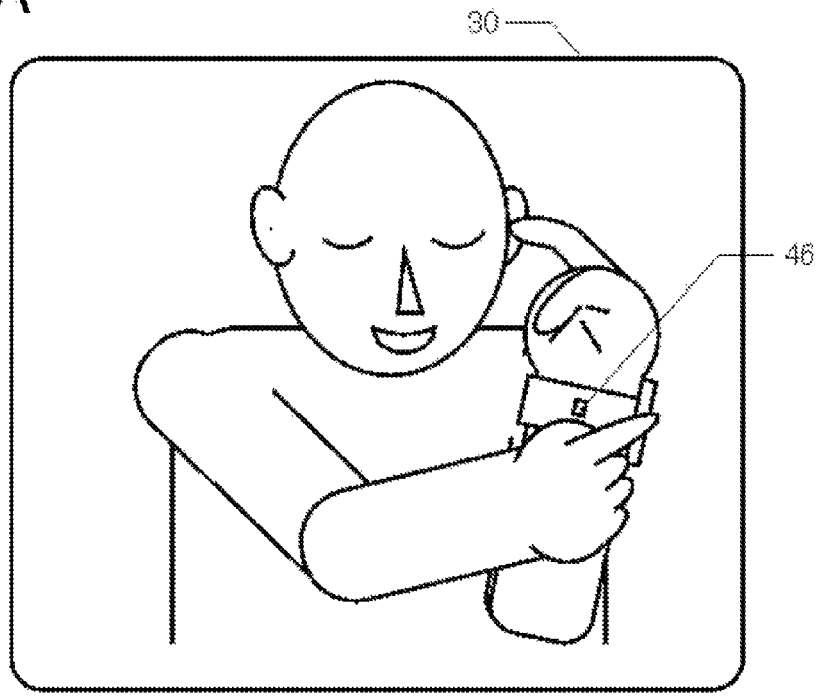
FIG. 3 is a diagram showing other screens displayed on a watch display to explain call-conducting postures in Embodiment 1.
Figure 3B:
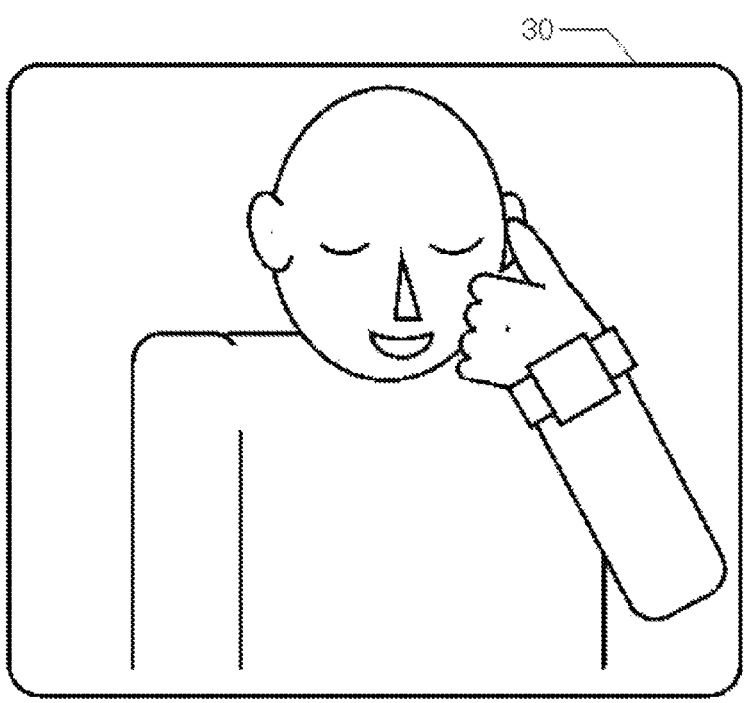

FIG. 3 is a diagram showing other screens displayed on the watch display 30 to explain call-conducting postures in Embodiment 1 shown in FIG. 1. FIG. 3(A) shows a screen explaining how, in the cartilage-conduction posture shown in FIG. 2(B), the user can press the switch 44 shown in FIG. 1 with the right hand. FIG. 3(B) shows a screen explaining another posture using cartilage conduction, in which posture the user puts the thumb of the hand (e.g., the left hand) on which the wrist watch-type handset 4 is worn on the tragus (ear cartilage) of the ear (e.g., the left ear) on the same side. Also in this call-conducting posture, the user's own voice can be conveyed to the other side by being collected by the variable-directivity microphone 46 which has its directivity directed toward the palm of the hand.

Figure 4A:
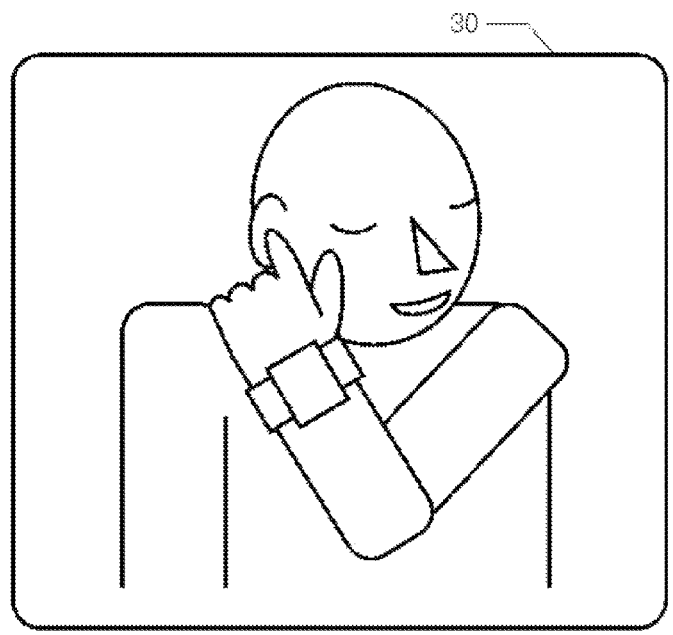
FIG. 4 is a diagram showing still other screens displayed on a watch display to explain call-conducting postures in Embodiment 1.
Figure 4B:
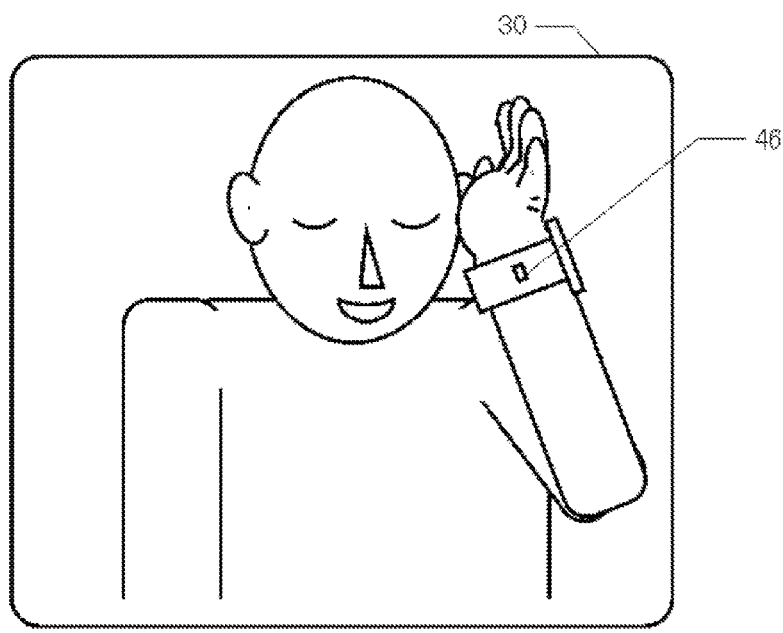

FIG. 4 is a diagram showing still other screens displayed on the watch display 30 to explain call-conducting postures in Embodiment 1 shown in FIG. 1. FIG. 4(A) shows a screen explaining a call-conducting posture relying on cartilage conduction in which the user holds the arm (e.g., the left arm) on which the wrist watch-type handset 4 is worn across the face to put the forefinger on the tragus (ear cartilage) of the ear (e.g., the right ear) on the opposite side. FIG. 4(B) shows a screen explaining yet another call-conducting posture relying on cartilage conduction in which the user puts the bulge in a lower part of the palm of the hand (e.g., the left hand) on which the wrist watch-type handset 4 is worn on the ear (e.g., the left ear) on the same side. In this case, the bulge on the palm makes contact with the cartilage around the earhole over a large area. By hard pressing, the earhole can be closed. In both of the postures shown in FIGS. 4(A) and 4(B), the user's own voice can be conveyed to the other side by being collected by the variable-directivity microphone 46 which has its directivity directed toward the palm oft hand.

Figure 5:
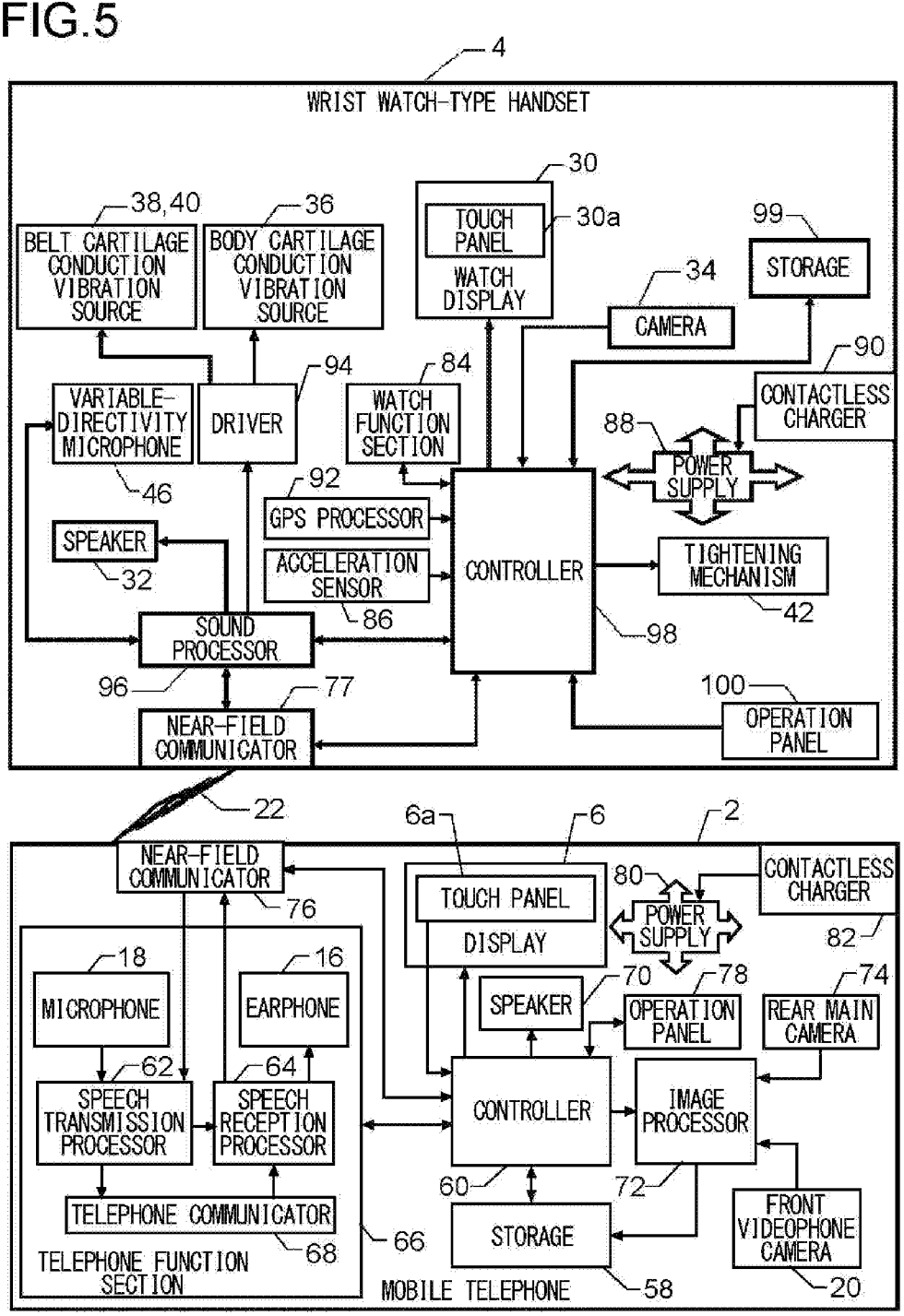
FIG. 5 is a block diagram of Embodiment 1.

FIG. 5 is a block diagram of Embodiment 1 shown in FIG. 1; there, such parts as appear also in FIG. 1 are identified by common reference signs, and no overlapping description will be repeated unless necessary. The mobile telephone 2 is controlled by a controller 60, which operates according to a program stored in a storage 58. The storage 58 also can temporarily store data needed for the control by the controller 60, and can store various kinds of measurement data and images. The display 6 provides display based on display data held in a display driver, under the control of the controller 60. The display 6 has a display backlight, of which the brightness the controller 60 adjusts according to the ambient illumination. The display 6 has a touch panel, so that by touching the display 6, the user can operate the mobile telephone 2.

A speech transmission processor 62, a microphone 18, a speech reception processor 64, and an earphone 16 constitute a telephone function section 66, which can connect to a wireless communication network via a telephone communicator 68, which is under the control of the controller 60. Under the control of the controller 60, a speaker 70 sounds ringtones, offers various kinds of audible guidance, and delivers the other side's voice during a videophone call. The audio delivered from the speaker 70 is not delivered from the earphone 16. Under the control of the controller 60, an image processor 72 processes the images shot by the front videophone camera 20 and the rear main camera 74, and feeds the processed images to the storage 58.

The mobile telephone 2 includes a near-field communicator 76 for communication with the wrist watch-type handset 4, and an operation panel 78 including, among others, a main switch for turning ON and OFF the main power. The entire mobile telephone 2 is supplied with electric power from a power supply 80, which has a rechargeable battery, which is charged by a contactless charger 82.

The wrist watch-type handset 4 includes a near-field communicator 77 for communication with the mobile telephone 2. The wrist watch-type handset 4 also includes a watch function section 84 for ordinary watch functions. An acceleration sensor 86 detects upward movement of the wrist watch-type handset 4 from FIG. 1(A) to (B) and downward movement of the wrist watch-type handset 4 from FIG. 1(B) to (A) to automatically switch the camera 34, the handset speaker 32, and the watch display 30 accordingly.

A power supply 88 of the wrist watch-type handset 4 and the power supply 80 of the mobile telephone 2 can be charged in a contactless fashion by the contactless charger 82 and a contactless charger 90 respectively. The wrist watch-type handset 4 and the mobile telephone 2 share information on each other's charge status by near-field communication to achieve coordination between them. Moreover, a GPS processor 92 detects movement of the user who is wearing the wrist watch-type handset 4, and each time it does, it checks whether or not the mobile telephone 2 is left behind without being carried around, thereby to secure coordination between the wrist watch-type handset 4 and the mobile telephone 2. Specifically, the GPS processor 92 checks whether or not the mobile telephone 2 has moved out of the near-field communication range as a result of the user's movement.

A driver 94 drives the cartilage conduction member 36 of the wrist watch body 26 and the cartilage conduction members 38 and 40 of the belt 28 all together to conduct vibration for cartilage conduction from around the wrist over a large area. In response to an instruction from a controller 98, a sound processor 96 switches whether to make the driver 94 generate vibration for cartilage conduction or to make the speaker 32 generate air-conducted sound. In response to an instruction from the controller 98 via the sound processor 96, the variable-directivity microphone 46 switches its directivity. The sound processor 96 also switches whether to make the driver 94 output an audio signal having a frequency range arousing the sense of vibration cut off or a vibration signal arousing the sense of vibration and having an audible frequency range cut off. The controller 98 operates according to a program stored in a storage 99. The storage 99 also can temporarily store data needed for the control by the controller 98, and can store various kinds of measurement data and images.

An operation panel 100 includes a button or the like for turning ON the main power, originating a call, and responding to a call. The watch display 30 is of a touch panel type as mentioned earlier, and has a touch panel 30a, on which the switch 44 or the like is displayed. By touching the watch display 30, the user can operate the mobile telephone 2.

Figure 6:
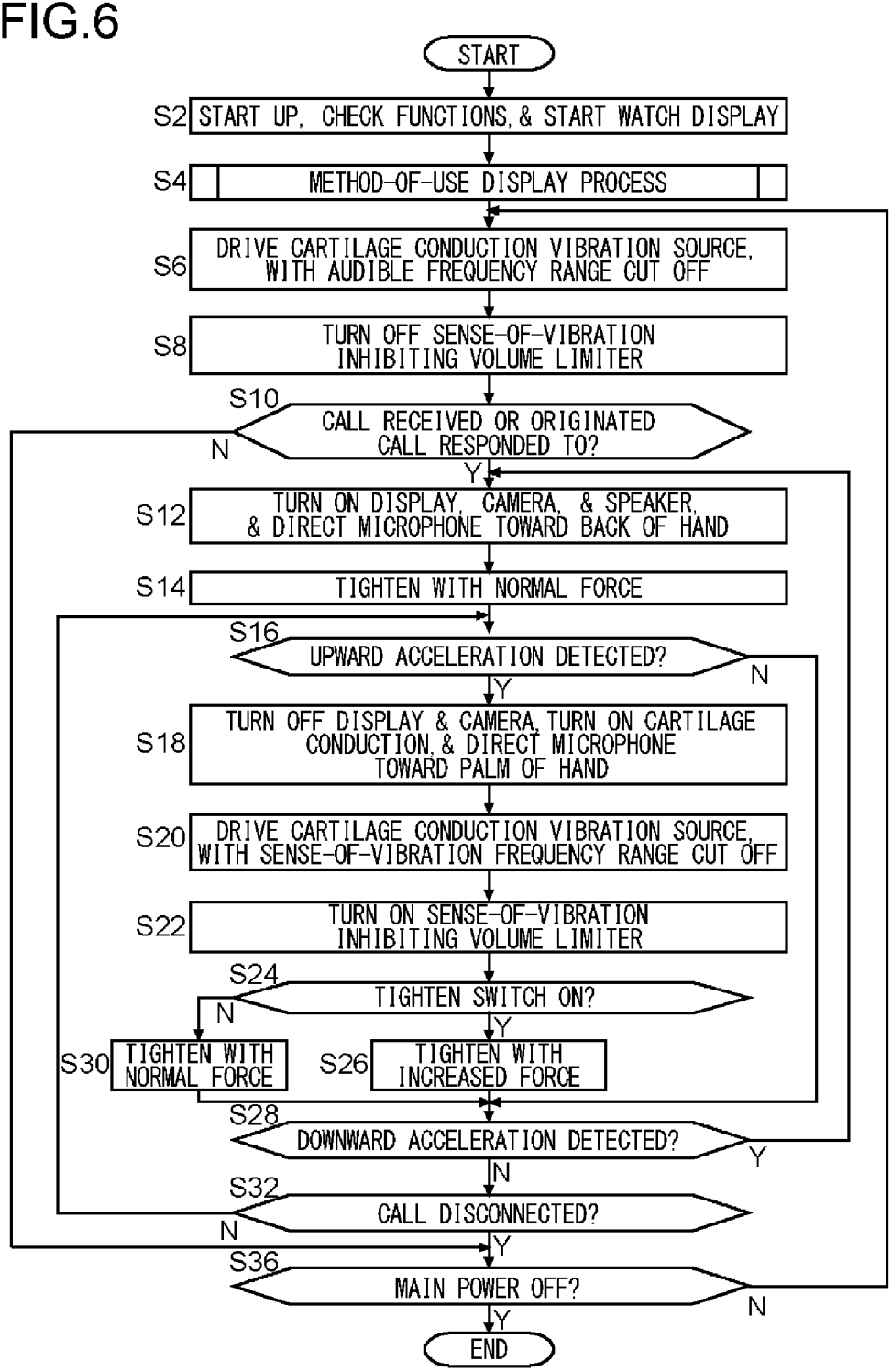
FIG. 6 is a flow chart showing the function of a controller of a wrist watch-type handset in Embodiment 1.

FIG. 6 is a flow chart showing the function of the controller 98 of the wrist watch-type handset 4 in Embodiment 1. The flow in FIG. 6 focuses on operation for functions related to cartilage conduction; in reality, the wrist watch-type handset 4 involves operation of the controller 98 that does not appear in the flow in FIG. 6, such as for ordinary wrist watch functions for instance. Specifically, FIG. 6 focuses on, among functions related to cartilage conduction, those for controlling the directivity of the variable-directivity microphone 46, for switching between a frequency range arousing the sense of vibration and an audible frequency range, and for controlling the tightening of the belt 28. To avoid complication, the other functions that have been described with reference to FIGS. 1 to 5 are also omitted from illustration and description.

The flow in FIG. 6 starts when the main power is turned ON on the operation panel 100 of the wrist watch-type handset 4. At step S2, a start-up procedure is gone through, the functions of relevant blocks are checked, and ordinary watch display on the watch display 30 is started. Next, at step S4, explanations of different methods of use as shown in FIGS. 2 to 4 are presented in a slide show. On completion of the explanations, the flow proceeds to Step S6.

At step S6, to make the cartilage conduction vibration sources 36, 38, and 40 vibrate chiefly around a frequency that arouse the sense of vibration (e.g., 20 Hz or less) so that the incoming-call vibration may be not heard by someone around, the circuit is so switched as to cut off an audible frequency range from the driving signal, the flow then proceeding to Step S8. At this time, the cartilage conduction vibration sources 36, 38, and 40 are not yet driven. If Step S6 is reached with an audible frequency range already cut off, nothing is done at step S6, and the flow proceeds to Step S8.

At step S8, a sense-of-vibration inhibiting volume limiter is turned OFF, and the flow proceeds to Step S10. As will be described later, the sense-of-vibration inhibiting volume limiter is a limiter that operates, when the cartilage conduction vibration sources 36, 38, and 40 are vibrated in an audible frequency range, to keep the sound volume under a predetermined level to prevent vibration in a low-frequency range that is not completely cut off from arousing an uncomfortable sense of vibration. The sense-of-vibration inhibiting volume limiter is provided in the sound processor 96. When the cartilage conduction vibration sources 36, 38, and 40 are vibrated as an incoming-call vibrator, the vibration is meant to arouse the sense of vibration. Accordingly, then, the sense-of-vibration inhibiting volume limiter is turned OFF, so that the sound volume can be raised to the maximum. If Step S8 is reached with the sense-of-vibration inhibiting volume limiter in an OFF state, nothing is done at step S8, and the flow proceeds to Step S10.

At step S10, it is checked whether or not the operation panel 100 of the wrist watch-type handset 4 has been operated in response to an incoming-call signal delivered from the mobile telephone 2 by near-field communication, or whether or not a call-originating operation made on the operation panel 100 of the wrist watch-type handset 4 has been delivered to the mobile telephone 2 by near-field communication and a notice that the other side has responded to it has been delivered from the mobile telephone 2 by near-field communication. In a case where an incoming-call signal has been delivered, the cartilage conduction vibration sources 36, 38, and 40 are vibrated as an incoming-call vibrator; here, these are vibrated with an audible frequency range cut off on the basis of the operation at step S6. If an operation responding to the incoming call has been made on the operation panel 100, or if the call originated from the mobile telephone 2 has been responded to, this means that the mobile telephone 2 has started a call with the other side, and thus the flow proceeds to Step S12.

At step S12, the display of the other side's face on the watch display 30, the shooting of the user's own face by the camera 34, and the generation of air-conducted sound by the speaker 32 are all turned ON, and in addition the directivity of the variable-directivity microphone 46 is directed toward the back of the hand, the flow then proceeding to Step S14. At this time, the cartilage conduction vibration sources 36, 38, and 40 are OFF. If Step S12 is reached already with the watch display 30 ON, the camera 34 ON, the speaker 32 ON, and the directivity of the variable-directivity microphone 46 directed toward the back of the hand, nothing is done at step S12, and the flow proceeds to Step S14. Next, at step S14, the belt 28 is brought into a normal tightened state, and the flow proceeds to Step S16. If Step S14 is reached with the belt 28 already in a normal tightened state, nothing is done at step S14, and the flow proceeds to Step S16. In this way, a call is started initially in a videophone mode, with the belt 28 in a normal tightened state. In the case of a voice-only call instead of a videophone call, out of the operations mentioned above, the display of the other side's face and the turning ON of the camera 34 are omitted.

At step S16, it is checked whether or not the acceleration sensor 86 has detected upward movement of the wrist watch-type handset 4 from FIG. 2(A) to (B). If so, then, at step S18, the display of the other side's face on the watch display 30, the shooting of the user's own face by the camera 34, and the generation of air-conducted sound by the speaker 32 are all turned OFF, and instead the cartilage conduction vibration sources 36, 38, and 40 are turned ON. In addition, the directivity of the variable-directivity microphone 46 is directed toward the palm of the hand, and the flow proceeds to Step S18. If Step S18 is reached already with the watch display 30 OFF, the camera 34 OFF, the cartilage conduction vibration sources 36, 38, and 40 ON, and the directivity of the variable-directivity microphone 46 directed toward the palm of the hand, nothing is done at step S18, and the flow proceeds to Step S20.

At step S20, the cartilage conduction vibration sources 36, 38, and 40 are vibrated in a frequency range of an audio signal (frequencies around 1000 Hz), with frequencies arousing the sense of vibration (e.g., 20 Hz or less) cut off so that no uncomfortable vibration may be sensed at the wrist, and the flow proceeds to Step S22. If Step S20 is reached with a sense-of-vibration arousing frequency range already cut off, nothing is done at step S20, and the flow proceeds to Step S22. At step S22, the sense-of-vibration inhibiting volume limiter mentioned earlier is turned ON, and the flow proceeds to Step S24. If Step S22 is reached with the sense-of-vibration inhibiting volume limiter already ON, nothing is done at step S22, and the flow proceeds to Step S24.

At step S24, whether or not the switch 44 is being pressed is checked. If so, then, at step S26, the tightening force of the belt 28 is increased, and the flow proceeds to Step S28. On the other hand, if the switch 44 is not detected being pressed, then, at step S30, the ordinary tightening force is restored, and the flow proceeds to Step S28.

At step S28, it is checked whether or not the acceleration sensor 86 has detected downward movement of the wrist watch-type handset 4 from FIG. 2(B) to (A), and if so, then at step S12, the videophone mode is restored. On the other hand, if, at step S28, no downward movement is detected (this state persists so long as a cartilage conduction call continues), the flow proceeds to Step S32, where whether or not the call has been disconnected is checked. If the call has not been disconnected, the flow returns to Step S16. Thereafter, until the call is detected having been disconnected at step S32, Steps S12 through S32 are repeated, so that switching between a cartilage-conduction call and a videophone call is performed to cope with change in posture, and the tightening force is changed according to whether or not the switch 44 is operated. If, at step S32, the call is detected having been disconnected, the flow proceeds to Step S36.

At step S36, it is checked whether or not the main power of the wrist watch-type handset 4 has been turned OFF. If not, the flow returns to Step S6, and thereafter, until the main power is detected having been turned OFF, Steps S6 through S36 are repeated. On the other hand, if, at step S36, the main power is detected having been turned OFF, the flow ends.

Figure 7:
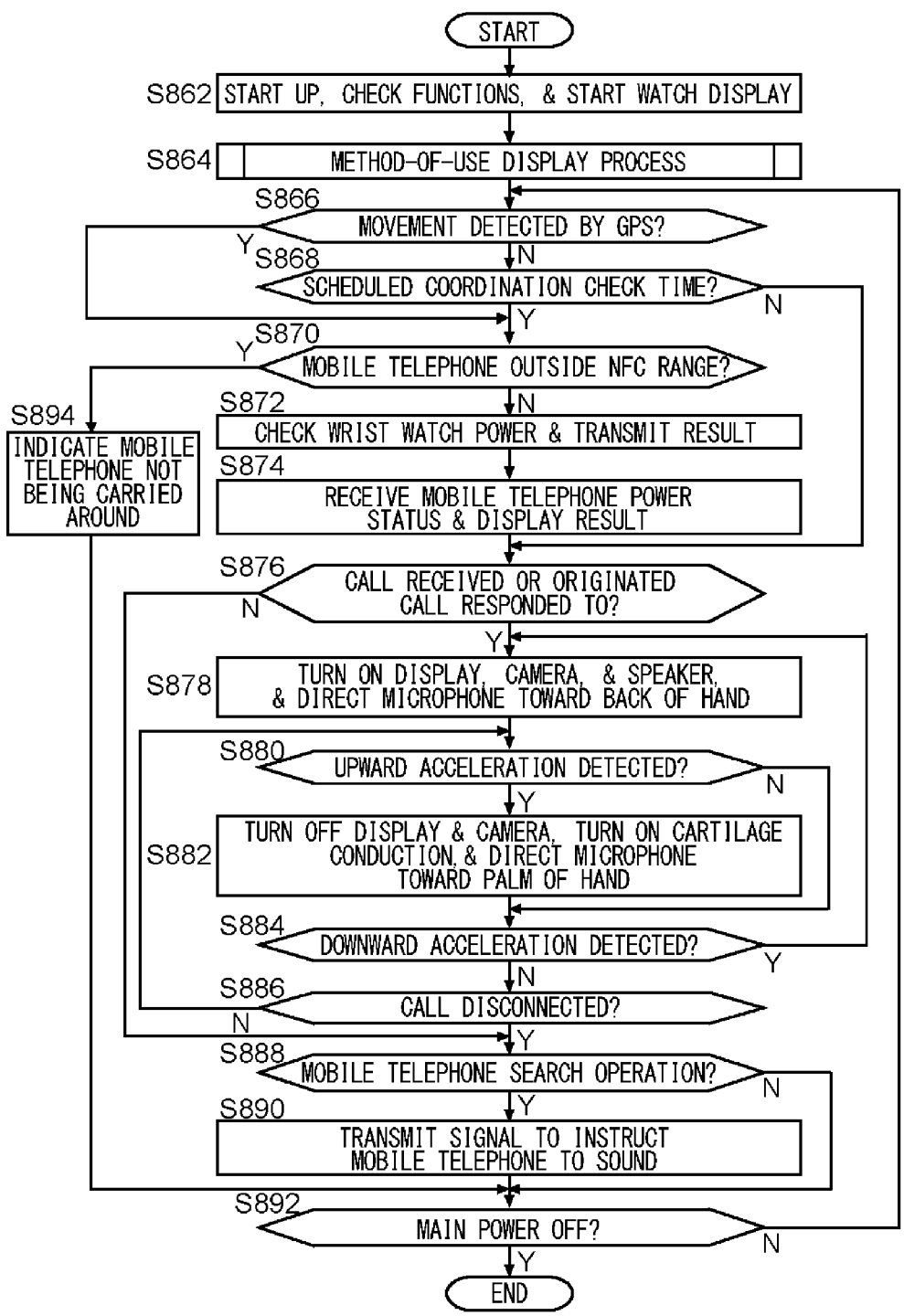
FIG. 7 is a flow chart showing, from another perspective, the function of a controller of a wrist watch-type handset in the Embodiment 1.

FIG. 7 is a flow chart showing, from another perspective, the function of the controller 98 of the wrist watch-type handset 4 in the Embodiment 1. Here again, the flow in FIG. 7 focuses on operation for functions related to cartilage conduction; in reality, the wrist watch-type handset 4 involves operation of the controller 4 that does not appear in the flow in FIG. 7, such as for ordinary wrist watch functions for instance. FIG. 7 focuses on, among functions related to cartilage conduction, those for controlling the directivity of the variable-directivity microphone 46, for achieving coordination with the mobile telephone 2, and so forth. To avoid complication, the other functions that have been described with reference to FIGS. 1 to 5, and the functions already described with reference to FIG. 6, are also omitted from illustration and description. For convenience' sake, different functions appear separately in FIGS. 6 and 7; in practice, the functions in FIGS. 6 and 7 can be implemented in an integrated manner.

The flow in FIG. 7 starts when the main power of the wrist watch-type handset 4 is turned ON. At step S862, a start-up procedure is gone through, the functions of relevant blocks are checked, and ordinary watch display on the watch display 30 is started. Next, at step S864, explanations of different methods of use as shown in FIGS. 2 to 4 are presented in a slide show. On completion of the explanations, the flow proceeds to Step S866, where it is checked whether or not the GPS processor 92 has detected user movement.

If no user movement has been detected, then, at step S868, it is checked whether or not a scheduled time (e.g., occurring every five seconds) has arrived at which to secure coordination with the mobile telephone 2. If so, the flow proceeds to Step S870. On the other hand, if, at step S866, the GPS processor 92 has detected user movement, the flow proceeds directly to Step S870. At step S870, it is checked whether or not the mobile telephone 2 has moved out of the near-field communication range, and if it is inside the near-field communication range, the flow proceeds to Step S872. At step S872, by near-field communication with the mobile telephone 2, the power status of the wrist watch-type handset 4, which is steadily displayed on the watch display 30, is checked, and the result is transmitted to the mobile telephone 2. The transmitted information is displayed on the mobile telephone 2. Then, at step S874, information on the power status of the mobile telephone 2 is received by near-field communication, and the result is displayed on the watch display 30, the flow then proceeding to Step S876. On the other hand, if, at step S868, a scheduled time has not arrived, the flow proceeds directly to Step S876.

At step S876, it is checked, by near-field communication, whether or not the mobile telephone 2 has received an incoming call, or whether or not a call-originating operation on the operation panel 6509 of the wrist watch-type handset 4 has been responded to by the other side. If either is the case, this means that a call with the other side has been started on the mobile telephone 2, and thus the flow proceeds to Step S878, where the display of the other side's face on the watch display 30, the shooting of the user's own face by the camera 34, and the generation of air-conducted sound by the speaker 32 are all turned ON, and in addition the directivity of the variable-directivity microphone 46 is directed toward the back of the hand, the flow then proceeding to Step S880. At this time, the cartilage conduction vibration sources 36, 38, and 40 are OFF. In this way, a call is started initially in a videophone mode. In the case of a voice-only call instead of a videophone call, out of the operations mentioned above, the display of the other side's face and the turning ON of the camera 34 are omitted.

At step S880, it is checked whether or not the acceleration sensor 86 has detected upward movement of the wrist watch-type handset 4 from FIG. 2(A) to (B). If so, then, at step S882, the display of the other side's face on the watch display 30, the shooting of the user's own face by the camera 34, and the generation of air-conducted sound by the speaker 32 are all turned OFF, and instead the cartilage conduction vibration sources 36, 38, and 40 are turned ON. In addition, the directivity of the variable-directivity microphone 46 is directed toward the palm of the hand, and the flow proceeds to Step S884.

At step S884, it is checked whether or not the acceleration sensor 86 has detected downward movement of the wrist watch-type handset 4 from FIG. 2(B) to (A), and if so, then at step S878, the videophone mode is restored. On the other hand, if, at step S884, no downward movement is detected (this state persists so long as a cartilage conduction call continues), the flow proceeds to Step S886, where whether or not the call has been disconnected is checked. If the call has not been disconnected, the flow returns to Step S880. Thereafter, until the call is detected having been disconnected at step S886, Steps S878 through S886 are repeated, so that switching between a cartilage-conduction call and a videophone call is performed to cope with change in posture. On the other hand, if, at Step S886, the call is detected having been disconnected, the flow proceeds to Step S888. If, at step S876, no call is detected having been started, the flow proceeds directly to Step S888.

At step S888, it is checked whether or not a mobile telephone search operation has been made on the operation panel 100. This operation is made, for example, when a user who is about to go out cannot find the mobile telephone 2. When this operation is made, the flow proceeds to Step S890, where, by near-field communication with the mobile telephone 2, an instruction signal is transmitted to the mobile telephone 2 to make it sound a ringtone (or actuate the vibrator), and the flow proceeds to Step S892.

On the other hand, if, at step S870, the mobile telephone 2 is detected having moved out of the near-field communication range, the flow proceeds to Step S894, where an indication is displayed to warn that the mobile telephone 2 is not being carried around, the flow then proceeding to Step S892. By various means as described above, coordination between the wrist watch-type handset 4 and the mobile telephone 2 is secured.

At step S892, it is checked whether or not the main power of the wrist watch-type handset 4 has been turned OFF, and if not, the flow returns to Step S866, so that thereafter, until the main power is detected having been turned OFF at step S892, Steps S866 through S892 are repeated. On the other hand, if, at step S892, the main power is detected having been turned OFF, the flow ends.

The various features of Embodiment 1 described above can be implemented not only in Embodiment 1 but also in any other embodiment so long as they provide their advantages. Moreover, as will be discussed below by way of some examples, the various features of Embodiment 1 can be implemented with various modifications. Modified features can be implemented in appropriate combinations with each other and with unmodified features.

For example, the vibration of the cartilage conduction vibration sources 38 and 40 conducts, via the conducting segment 41 in the belt 28, also to the part of the belt 28 where the cartilage conduction vibration sources 38 and 40 are not located; thus, in a case where the conducting segment 41 has high conduction efficiency, one of the cartilage conduction vibration sources 38 and 40 may be omitted. A configuration is also possible where the vibration of the cartilage conduction vibration source 36 of the wrist watch body 26 is conducted to the conducting segment 41. This configuration permits delivery of vibration from around the wrist over a large area even with the cartilage conduction vibration sources 38 and 40 both omitted. Conversely, a configuration is also possible where the conducting segment 41 is extended to the reverse side of the wrist watch body 26 so as to conduct to it the vibration of one or both of the cartilage conduction vibration sources 38 and 40. This configuration permits even the cartilage conduction vibration source 36 to be omitted. In this way, so long as vibration for cartilage conduction can be conducted substantially over a large area around the wrist, a smaller number of cartilage conduction vibration sources, or a single cartilage conduction vibration source, will do. Conversely, a larger number of cartilage conduction vibration sources than in Embodiment 1 may be provided to boost the conduction of vibration for cartilage conduction from around the wrist over a large area.

Instead of the switch 44 being displayed on the watch display 30, a button having a similar function may be provided at a position corresponding to the cartilage conduction vibration source 38 or 40 in the belt 28. Also with this design, an action to press the button serves as an action to bring the cartilage conduction vibration source 38 or 40 in close contact with the wrist. The tightening force does not necessarily have to be switched manually in this way; a configuration is also possible where the tightening force is increased automatically when an upward acceleration is detected at step S16 in FIG. 6. In that case, a brief voice message saying "the belt will be tightened" may be sounded before the speaker 32 is turned OFF at step S18 so as not to surprise the user. For simplicity's sake, the tightening mechanism may be omitted, in which case the cartilage conduction vibration source 38 or 40 is brought into close contact with the wrist simply by the action of pressing the switch 44. In this case, the switch 44 can be assigned a function of turning ON the vibration of the cartilage conduction vibration sources 38 and 40 for sound conduction. The switch 44 itself may be omitted, in which case guidance can be displayed on the watch display 30 to instruct the user to press somewhere near where the cartilage conduction vibration sources 38 and 40 are located.

Furthermore, Embodiment 1 is configured so as to conduct vibration from around the wrist over as large an area as possible, and so as to absorb differences in the position suitable for vibration conduction among individual users, displacements of the wrist watch-type handset 4 while it is being worn, and so forth. As another, contrastive embodiment, a configuration is also possible where the point of effective vibration conduction is measured for each individual so that vibration concentrates at the optimal position. Even in that case, with consideration given to displacements during use, some margin is allowed for with respect to the conduction area in which to concentrate vibration.

Instead of the variable-directivity microphone 46 in Embodiment 1, a wide-angle microphone may be adopted that can collect sound both from the direction of the back of the hand and from the direction of the palm of the hand.

Embodiment 2

FIG. 8 is a diagram showing a screen displayed to explain a call-conducting posture in a wrist watch-type handset 104 according to another embodiment, Embodiment 2, of the present invention, accompanied by exterior views of the handset 104 in a worn state. The wrist watch-type handset 104 according to Embodiment 2 shares the basic configuration with Embodiment 1 shown in FIGS. 1 to 7; accordingly, in the following description, as to the basic configuration, complementary reference is made to FIG. 1, etc. as necessary.

Like Embodiment 1, Embodiment 2 is configured as a system comprising a mobile telephone 2 and a wrist watch-type handset 104 as shown in FIG. 1. The mobile telephone 2 here is similar to that in Embodiment 1, and therefore its description will be omitted. The wrist watch-type handset 104 too has much in common with its counterpart; therefore, common parts are identified by common reference numerals, and no overlapping description will be repeated unless necessary.

Figure 8A:
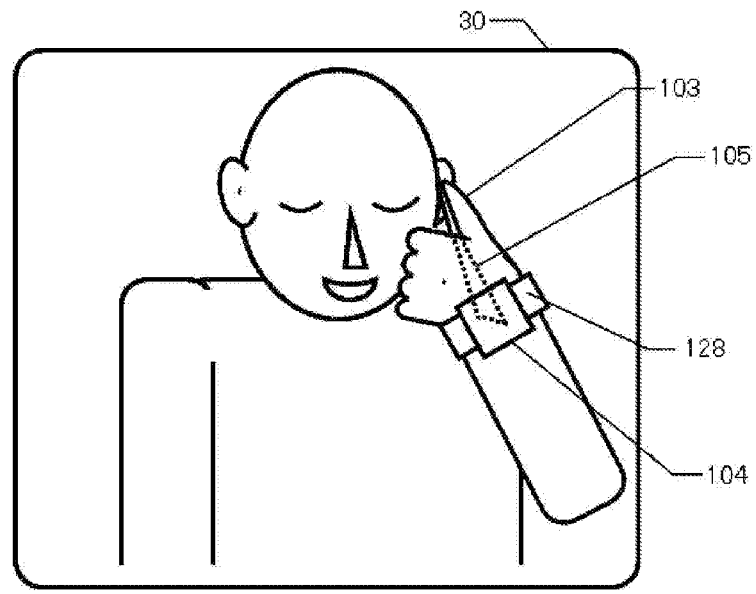
FIG. 8 is a diagram showing a screen displayed to explain a call-conducting posture in a wrist watch-type handset according to a second embodiment (Embodiment 2) of the present invention, accompanied by exterior views of a handset 104 in a worn state.

In Embodiment 2, as in Embodiment 1, screens for explaining call-conducting postures for the wrist watch-type handset 104 are displayed on a watch display 30. FIG. 8(A) is a diagram showing a screen explaining a call-conducting posture for the wrist watch-type handset 104 according to Embodiment 2, and this call-conducting posture is basically similar to that shown in FIG. 3(B) in Embodiment 1. However, in Embodiment 2, the wrist watch-type handset 104 is configured differently: it is provided with a collapsible prop 105 which can be unfolded so as to rise from a palm-side part of a belt 128 along the inner side of the thumb 103, and at a tip end part of the collapsible prop 105, a cartilage conduction member 138 comprising a piezoelectric bimorph element or the like is supported. FIG. 8(A) shows a screen explaining a call-conducting posture in which the user obtains cartilage conduction by pressing the cartilage conduction member 138 onto the tragus with a tip end part of the thumb 103 while holding a middle part of the collapsible prop 105 between the base of the thumb 103 and the forefinger. As will be described later, the collapsible prop 105 is formed of a flexible sheet-form material such as plastic. When held between the base of the thumb 103 and the forefinger, the collapsible prop 105 develops a slight twist, which makes its tip end part fit along the ball of the thumb 103.

Figures 8B, 8C, 8D:
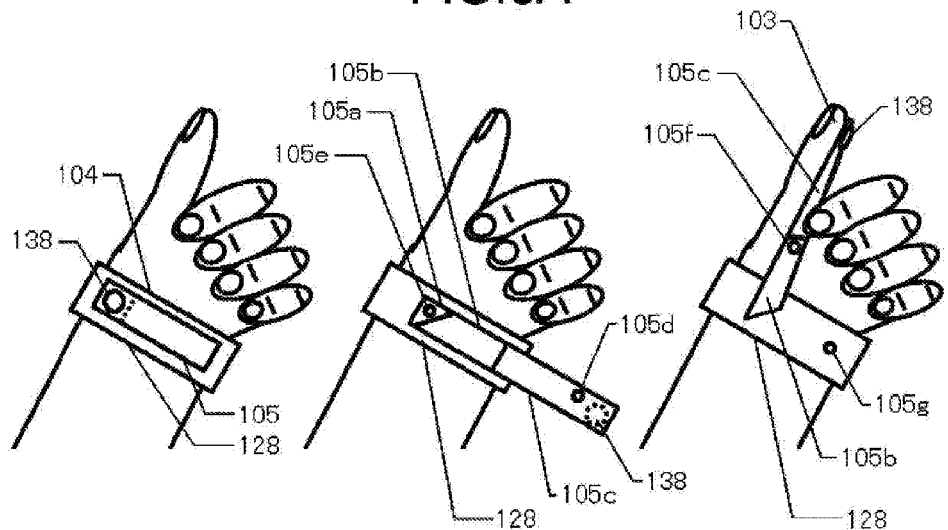

FIGS. 8(B) to 8(D) are enlarged views that focus on and around the hand out of the explanation screen, illustrating the operation of raising the collapsible prop 105 from a retracted state to a cartilage conduction state as seen from in front of the palm. That is, FIGS. 8(B) to 8(D) show a state where the wrist has been rotated by 180 degrees from the state in FIG. 8(A). FIG. 8(B) shows a retracted state, where the collapsible prop 105 is folded up into the belt 128 to lie along the belt 128, with substantially no protrusion from it. Here, the cartilage conduction member 138 is in contact with the belt 128, and, as in Embodiment 1, when used as a vibration source for an incoming-call vibrator, it conducts incoming-call vibration to the wrist via the belt 128.

FIG. 8(C) shows a state where the collapsible prop 105 has been unfolded halfway on the way before being raised fully. As will be understood from FIG. 8(C), the collapsible prop 105 divides into a base part 105a fastened to the belt 128, a middle part 105b, and a support part 105c. At a tip end part of the support part 105c, the cartilage conduction member 138 is supported. Between the base part 105a and the middle part 105b is a twist-bendable part, and between the middle part 105b and the support part 105c is a foldable part. The collapsible prop 105 is formed of a sheet-form material that is flexible and durable to repeated bending, such as plastic, so that the twist-bendable part and the foldable part are durable to repeated folding and unfolding. In FIG. 8(C), a hook 105d has been disengaged from a hook 105e, so that the middle part 105b has been unfolded from the support part 105c.

In FIG. 8(D), a hook 105f has been disengaged from a hook 105g, and the middle part 105b has been twist-bent 90 degrees relative to the base part 105a (hidden in FIG. 8(D)) at the twist-bendable part. In this way, the middle part 105b and the support part 105c are raised to extend along the thumb 103. Holding a middle part of the collapsible prop 105 between the base of the thumb 103 and the forefinger against the resilience of the collapsible prop 105 makes the collapsible prop 105 as a whole twist slightly, and this permits the cartilage conduction member 138, supported at the tip end part of the support part 105c, to fit along the ball of the thumb 103. Thus, when the tip of the thumb 103 is pressed onto the tragus as shown in FIG. 8(A), the cartilage conduction member 138 is held between the thumb 103 and the tragus, achieving satisfactory cartilage conduction from the cartilage conduction member 138 to the tragus.

To collapse the collapsible prop 105, the above procedure is gone through in the reverse direction, from FIG. 8(D) to FIG. 8(B): while the collapsible prop 105 is folded, the hook 105f is engaged with the hook 105g, and then the hook 105d is engaged with the hook 105e. The above-described operation for raising and collapsing the collapsible prop 105 can be performed, for example in a case where the wrist watch-type handset 104 is being worn on the left hand as shown in FIG. 8, with the right hand alone.

For the sake of convenience, the operation of raising the collapsible prop 105 from the state in FIG. 8(B) to the state in FIG. 8(D), and of collapsing the collapsible prop 105 from the state in FIG. 8(D) to the state in FIG. 8(B), is illustrated and described in multiple steps. The operation does not necessarily have to be performed in separate steps as in FIG. 8, but the whole operation can be performed as a continuous sequence performed with a part around the cartilage conduction member 138 held in the right hand; that is, it can be performed substantially in a single action.

The collapsible prop 105 can be formed of a plastic with a shape memory property so that it memorizes a shape halfway between the retracted state and the raised state and assumes this shape when left alone. Then, both when raised from the retracted state and when collapsed from the raised state, the collapsible prop 105 suggests how it is going to change shape toward the final one. This saves the user the trouble of figuring out how to operate, and facilitates the operation from the memorized shape to the final shape.

Figure 9:
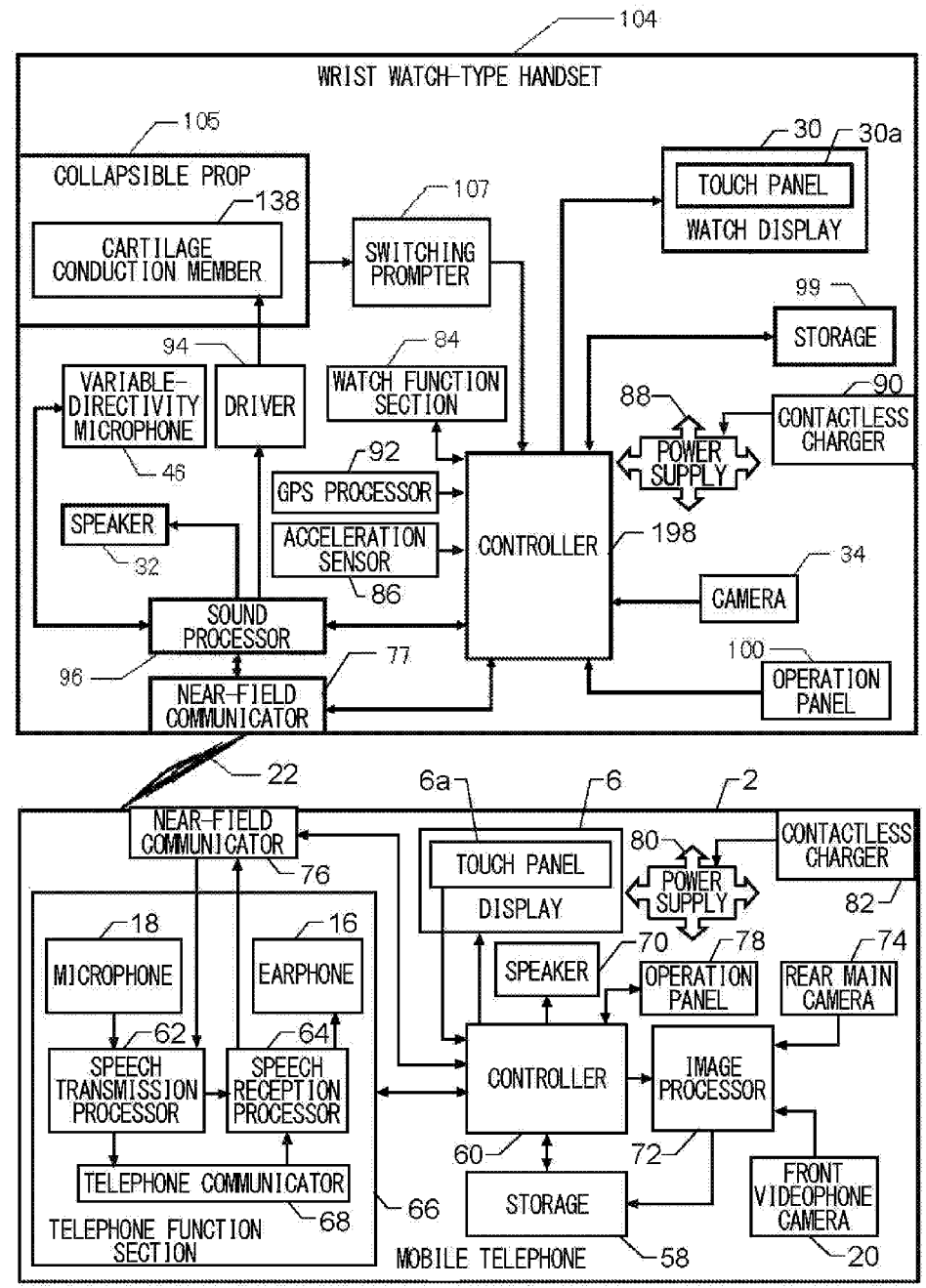
FIG. 9 is a system block diagram of Embodiment 2.

FIG. 9 is a system block diagram of Embodiment 2 shown in FIG. 8. FIG. 9 has much in common with FIG. 5, which is a system block diagram of Embodiment 1; therefore, common parts are identified by common reference signs, and no overlapping explanation will be repeated unless necessary. In particular, the mobile telephone 2 in FIG. 9 has the same configuration as in FIG. 2, and therefore its description will be completely omitted.

The wrist watch-type handset 104 in Embodiment 2 in FIG. 9 differs from the wrist watch-type handset 4 in Embodiment 1 in FIG. 1 in the additional provision of the collapsible prop 105 and in aspects associated with it. When the collapsible prop 105 is in the retracted state in FIG. 8(B), a switching prompter 107 detects the state and feeds a retraction detection signal to a controller 198. In response to the retraction detection signal, the controller 198 controls the sound processor 96 such that the driver 94 makes the cartilage conduction member 138 vibrate around a frequency that arouses the sense of vibration (e.g., 20 Hz or less), with an audible frequency range cut off so that the vibration may not be heard by someone around. Thus, the cartilage conduction member 138 is used as a vibration source for an incoming-call vibrator. Moreover, in response to the retraction detection signal, the controller 198 controls the sound processor 96 such that the speaker 32 delivers an audio signal. Furthermore, in response to the retraction detection signal, the controller 198 controls the sound processor 96 such that the directivity of the variable-directivity microphone 46 is directed toward the back of the hand, and turns ON the watch display 30.

On the other hand, when the collapsible prop 105 is detected being in the raised state in FIG. 8(D), the switching prompter 107 feeds a protraction detection signal to the controller 198. In response to the protraction detection signal, the controller 198 controls the sound processor 96 such that the driver 94 makes the cartilage conduction member 138 vibrate in a frequency range of an audio signal (frequencies around 1000 Hz), with frequencies that arouse the sense of vibration (e.g., 20 Hz or less) cut off so that no uncomfortable vibration is sensed at the thumb 103. Moreover, in response to the protraction detection signal, the controller 198 controls the sound processor 96 such that the speaker 32 is turned OFF, and that the directivity of the variable-directivity microphone 46 is directed toward the palm of the hand. At this time, the watch display 30 is turned OFF.

Embodiment 3

FIG. 10 is a diagram showing a screen displayed to explain a call-conducting posture in a wrist watch-type handset 204 according to yet another embodiment, Embodiment 3, of the present invention, accompanied by exterior views of the handset 204 in a worn state. The wrist watch-type handset 204 according to Embodiment 3 has much in common with Embodiment 2 shown in FIG. 8; therefore, common parts are identified by common reference numerals, and no overlapping description will be repeated.

Figure 10A:
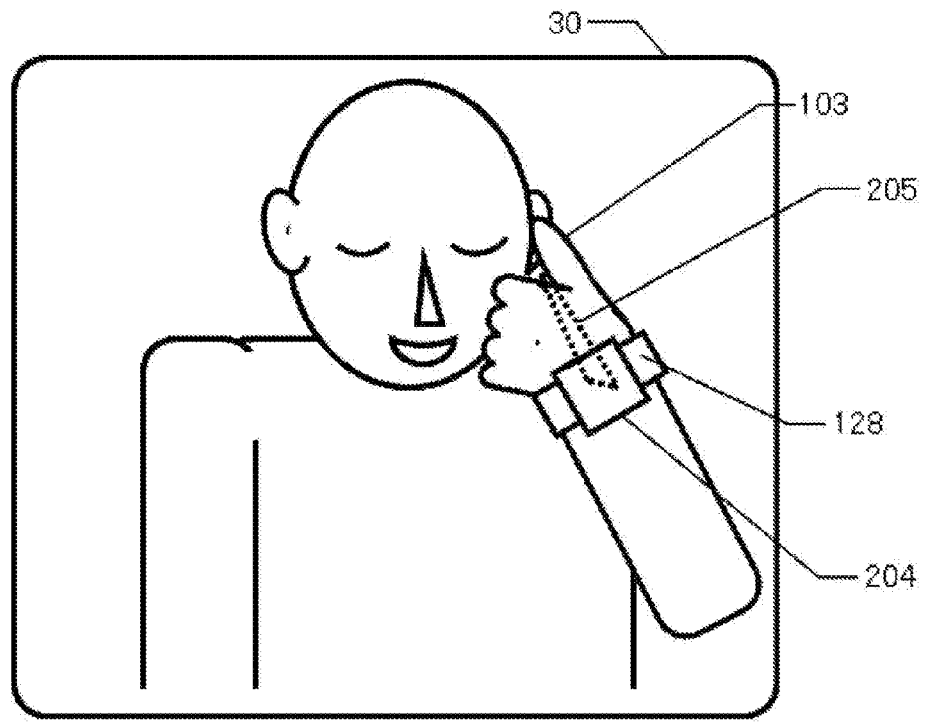
FIG. 10 is a diagram showing a screen displayed to explain a call-conducting posture in a wrist watch-type handset according to a third embodiment (Embodiment 3) of the present invention, accompanied by exterior views of a handset in a worn state.

Like Embodiment 2, Embodiment 3 is configured as a system comprising a mobile telephone 2 and a wrist watch-type handset 204 as shown in FIG. 1. Also in Embodiment 3, as in Embodiment 2, screens explaining call-conducting postures for the wrist watch-type handset 204 are displayed on the watch display 30. FIG. 10(A) shows a screen explaining a call-conducting posture for the wrist watch-type handset 204 according to Embodiment 3, and this call-conducting posture is similar to that in FIG. 8(A).

Embodiment 3 differs from Embodiment 2 in the configuration of a collapsible prop 205. As in Embodiment 2, the collapsible prop 205 rises from a palm-side part of the belt 128 along the inner side of the thumb 103, and at a tip end part of the collapsible prop 205, a cartilage conduction member 238 comprising a piezoelectric bimorph element or the like is supported; however, the collapsible prop 205 here differs in some aspects such as structure and how it achieves cartilage conduction. Specifically, as shown in FIG. 10(A), the vibration of the cartilage conduction member 238, comprising a piezoelectric bimorph element or the like, supported at the tip end part of the collapsible prop 205 is conducted to the base of the thumb 103, and the vibration conducts farther on along the thumb 103 to reach a tip end part thereof. With the tip end part of the thumb 103 put on the tragus, cartilage conduction is achieved. In that vibration is conducted via the tissue of the hand, Embodiment 3 is similar to Embodiment 1. Accordingly, the collapsible prop 205 is shorter than in Embodiment 2, and has a simpler structure, having a single bendable part.

Figures 10B, 10C:
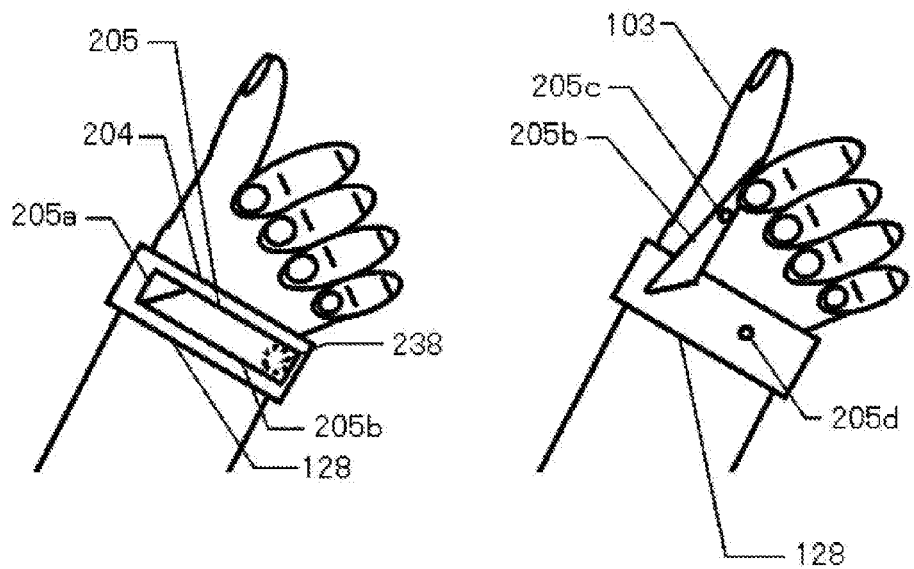

FIGS. 10(B) and 10(C) are, as in Embodiment 2, enlarged views that focus on and around the hand out of the explanation screen, illustrating the operation of raising the collapsible prop 205 from a retracted state to a cartilage conduction state as seen from in front of the palm. FIG. 10(B) shows a retracted state, where, as in Embodiment 2, the collapsible prop 205 is folded up into the belt 128 to lie along the belt 128, with substantially no protrusion from it. Here, the cartilage conduction member 238 is in contact with the belt 128, and, as in Embodiment 2, when used as a vibration source for an incoming-call vibrator, it conducts incoming-call vibration to the wrist via the belt 128.

As will be clear from FIG. 10(B), the collapsible prop 205 divides into a base part 205a fastened to the belt 128 and a support part 205b, and the cartilage conduction member 238 is supported at a tip end part of the support part 205b. Between the base part 205a and the support part 205b is a twist-bendable part. As in Embodiment 2, the collapsible prop 205 is formed of a sheet-form material that is flexible and durable to repeated bending, such as plastic, so that the twist-bendable part is durable to repeated folding and unfolding.

FIG. 10(C) shows a state in which a hook 205c has been disengaged from a hook 205d, so that the support part 205b has been twist-bent 90 degrees relative to the base part 205a (hidden in FIG. 10(D)) at the twist-bendable part. In this way, the support part 205b is raised toward the base of the thumb 103. Holding a middle part of the collapsible prop 205 between the base of the thumb 103 and the forefinger against the resilience of the collapsible prop 205 makes the collapsible prop 205 as a whole twist slightly, and this permits the cartilage conduction member 238, supported at the tip end part of the support part 205c, to fit along the ball of the thumb 103. Thus, when the tip of the thumb 103 is pressed onto the tragus as shown in FIG. 10(A), the vibration conducted from the cartilage conduction member 238 to the base of the thumb 103 conducts to the tragus in contact with the tip end of the thumb, achieving satisfactory cartilage conduction.

To collapse the collapsible prop 205, the above procedure is gone through in the reverse direction, from FIG. 10(C) to FIG. 10(B): while the collapsible prop 205 is folded, the hook 205c is engaged with the hook 205d. The above-described operation for raising and collapsing the collapsible prop 205 can be performed, for example in a case where the wrist watch-type handset 204 is being worn on the left hand as shown in FIG. 10, with the right hand alone.

Embodiment 4

FIG. 11 is an exterior perspective view of a wrist watch-type handset 304 according to still another embodiment, Embodiment 4, of the present invention, accompanied by exterior views of the handset 304 in a worn state. The wrist watch-type handset 304 according to Embodiment 4 has much in common with Embodiment 2 shown in FIG. 8; therefore, common parts are identified by common reference signs, and no overlapping description will be repeated.

Like Embodiment 2, Embodiment 4 is configured as a system comprising a mobile telephone 2 and a wrist watch-type handset 304 as shown in FIG. 1. Embodiment 4 differs from Embodiment 2 in the provision of a support belt 305 in place of a collapsible prop 205. As in Embodiment 2, the support belt 305 rises from a palm-side part of a belt 328 along the inner side of the thumb 103, and at a tip end part of the support belt 305, a cartilage conduction member 338 comprising a piezoelectric bimorph element or the like is supported; however, the support belt 305 here differs from the collapsible prop 205 in structure.

Figure 11A:
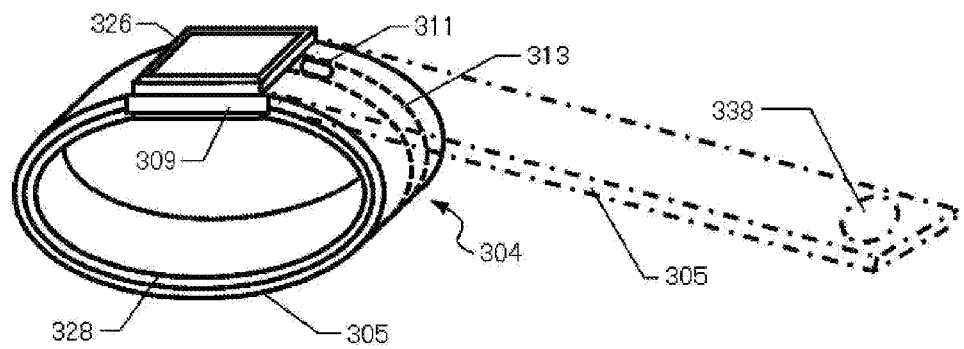
FIG. 11 is an exterior perspective view of a wrist watch-type handset according to a fourth embodiment (Embodiment 4) of the present invention, accompanied by exterior views of a handset in a worn state.

FIG. 11(A) is an exterior perspective view of the wrist watch-type handset 304 according to Embodiment 4, showing a structure where the support belt 305 is detachably wound around the outer side of the belt 328. In FIG. 11(A), solid lines indicate a state where the support belt 305 is wound around the outer side of the belt 328, and in this state, the wrist watch-type handset 304 has an exterior appearance no different from that of an ordinary wrist watch. In this state, the support belt 305 is locked on a wrist watch body 326 by interlocked latches 309. The interlocked latches 309 are provided respectively at opposite sides of the wrist watch body 326 (the one at the farther side is invisible, and is not shown). The interlocked latches 309 are so structured as to unlock when pressed in from opposite sides simultaneously but not to unlock even when only one of them is pressed in inadvertently. Unlocking the interlocked latches 309 makes the support belt 305 loose, at opposite ends, from the wrist watch body 326. As in Embodiment 2, the support belt 305 is formed of a flexible sheet-form material.

In FIG. 11(A), dash-and-dot lines indicate a state of the support belt 305 where it has come loose from the wrist watch body 326 and has been at one end unwound rightward as seen in the diagram. At its other end, the support belt 305 is slidably coupled, via a pin 311 with an oval cross-section, into a slit 313 in the belt 328. Thus, even in the state indicated by the dash-and-dot lines, the support belt 305 does not drop off the wrist watch body 326. Owing to the combination of the pin 311 with an oval cross-section and the slit 313, the support belt 305 can be slid only in the direction along the belt 328 so as to be drawn out from the state in FIG. 11(A) farther rightward as seen in the diagram. At one end (in the diagram, the right end) of the support belt 305, the cartilage conduction member 338 is supported.

Figure 11B:
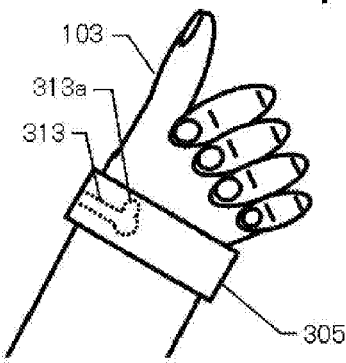

FIG. 11(B) to 11(E) are, as in Embodiment 2, enlarged views that focus on and around the hand out of the explanation screen, illustrating the operation of raising the support belt 305 from a retracted state to a cartilage conduction state as seen from in front of the palm. FIG. 11(B) shows a retracted state, where, as in Embodiment 2, the support belt 305 lies along the belt 328. Thus, as shown in FIG. 11(A), the belt 328 as a whole has an exterior appearance of an ordinary belt. Here, the cartilage conduction member 338 is in contact with the belt 328, and, as in Embodiment 2, when used as a vibration source for an incoming-call vibrator, it conducts incoming-call vibration to the wrist via the belt 328. The slit 313 has at one end a bent part 313a, which guides the support belt 305 such that, as will be described later, it can rise along the thumb 103 and remain in that position.

Figure 11C:
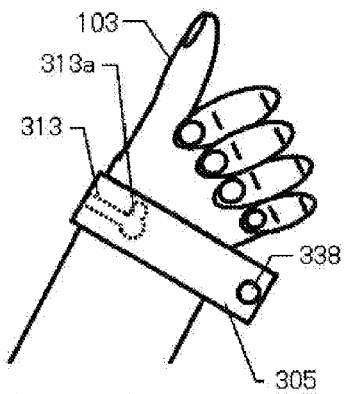

FIG. 11(C) shows a state (corresponding to the state in FIG. 11(A)) in which unlocking the interlocked latches 309 has made only one end of the support belt 305 loose from the wrist watch body 326. Here, unlike in FIG. 11(A), the support belt 305 in a state still mostly wound around the wrist and pointing toward the little finger is viewed from in front of the palm, and thus the support belt 305 appears shorter than it really is.

Figure 11D:
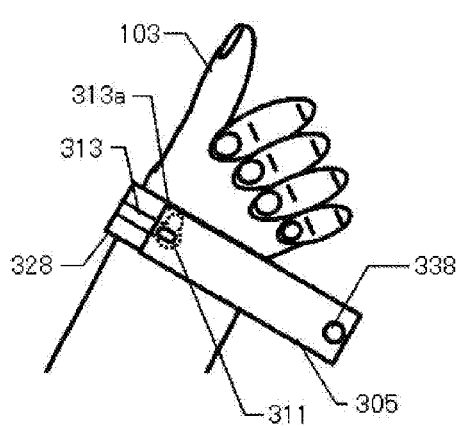

FIG. 11(D) shows a state where the support belt 305 has been drawn rightward as seen in the drawing, and the pin 311 with an oval cross-section has reached an end of the slit 313. Up to this state, as described above, owing to the combination of the pin 311 with an oval cross-section and the slit 313, the support belt 305 can slide only in the direction along the belt 328. Once in the state in FIG. 11(D), the support belt 305 can be rotated in the counter-clockwise direction as seen in the diagram.

Figure 11E:
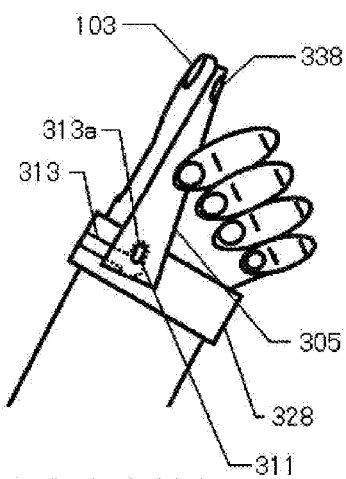

FIG. 11(E) shows a state where, from the state in FIG. 11(D), the support belt 305 has been rotated farther and raised toward the thumb 103. In this state, the pin 311 with an oval cross-section fits in the bent part 313a, and prevents the support belt 305 from rotating farther from the state in FIG. 11(E). In this state, holding a middle part of the support belt 305 between the base of the thumb 103 and the forefinger against the resilience of the support belt 305 makes the support belt 305 as a whole twist slightly, and this permits the cartilage conduction member 338, supported at the tip end part of the support belt 305, to fit along the ball of the thumb 103. Thus, when the tip of the thumb 103 is pressed onto the tragus, the cartilage conduction member 338 is held between the thumb 103 and the tragus, achieving satisfactory cartilage conduction from the cartilage conduction member 338 to the tragus.

For the sake of convenience, the operation of raising the support belt 305 from the state in FIG. 11(C) to the state in FIG. 11(E), and of putting away the support belt 305 from the state in FIG. 11(E) to the state in FIG. 11(C), is illustrated and described in multiple steps. The operation does not necessarily have to be performed in separate steps as in FIG. 11, but the whole operation can be performed as a continuous sequence performed with a part around the cartilage conduction member 338 held in the right hand; that is, it can be performed substantially in two actions, namely one action to unlock the interlocked latches 309 and another to raise the support belt 305.

To retract the support belt 305, the above procedure is gone through in the reverse direction, from FIG. 11(E) to FIG. 11(B): the support belt 305 is slid, and a part of the support belt 305 in which the cartilage conduction member 338 is provided is pressed onto the wrist watch body 326; this locks the interlocked latches 309, and thus the support belt 305 is at opposite ends locked on the wrist watch body 326. During the operation, the other end part of the support belt 305 slides toward the wrist watch body 326 while the pin 311 with an oval cross-section is guided along the bent part 313a. Thus, no conscious positioning is required. The above-described operation for raising and retracting the support belt 305 can be performed, for example in a case where the wrist watch-type handset 304 is being worn on the left hand as shown in FIG. 11, with the right hand alone.

Embodiment 5

FIG. 12 comprises exterior views of a wrist watch attachment-type handset 404, in a worn state, according to still another embodiment, Embodiment 5, of the present invention. The wrist watch attachment-type handset 404 according to Embodiment 5 has much in common with Embodiment 2 shown in FIG. 8; therefore, common parts are identified by common reference signs, and no overlapping description will be repeated.

Like Embodiment 2, Embodiment 5 is configured as a system comprising a mobile telephone 2 and a wrist watch attachment-type handset 404 as shown in FIG. 1. Embodiment 5 differs from Embodiment 2 in that the handset is configured not as a wrist watch-type one but a wrist watch attachment-type one. A specific description follows.

FIG. 12(A) to FIG. 12(D) are exterior views of a wrist watch 400 worn on the left hand as seen from in front of the palm. FIG. 12(A) shows an ordinary wrist watch 400 in a state where a belt 428 is visible from in front of the palm.

On the other hand, FIG. 12(B) shows a state where the wrist watch attachment-type handset 404 according to Embodiment 5 has been attached to a palm-side part of the belt 428 from outside. Except that the wrist watch attachment-type handset 404 according to Embodiment 5 is a wrist watch attachment-type one, it has the same configuration for cartilage conduction as in Embodiment 2 in FIG. 8, and FIGS. 12(B) to 12(D) correspond to FIGS. 8(B) to 8(D) respectively. Therefore, corresponding parts are identified by common reference signs, and no overlapping description will be repeated. In Embodiment 5, the wrist watch 400 itself constitutes no part of a handset, and a whole configuration for speech transmission and reception by cartilage conduction in coordination with the mobile telephone 2 is implemented in the wrist watch attachment-type handset 404. As for the exterior appearance in FIG. 12, the wrist watch attachment-type handset 404 is provided with a microphone 446.

Figure 13:
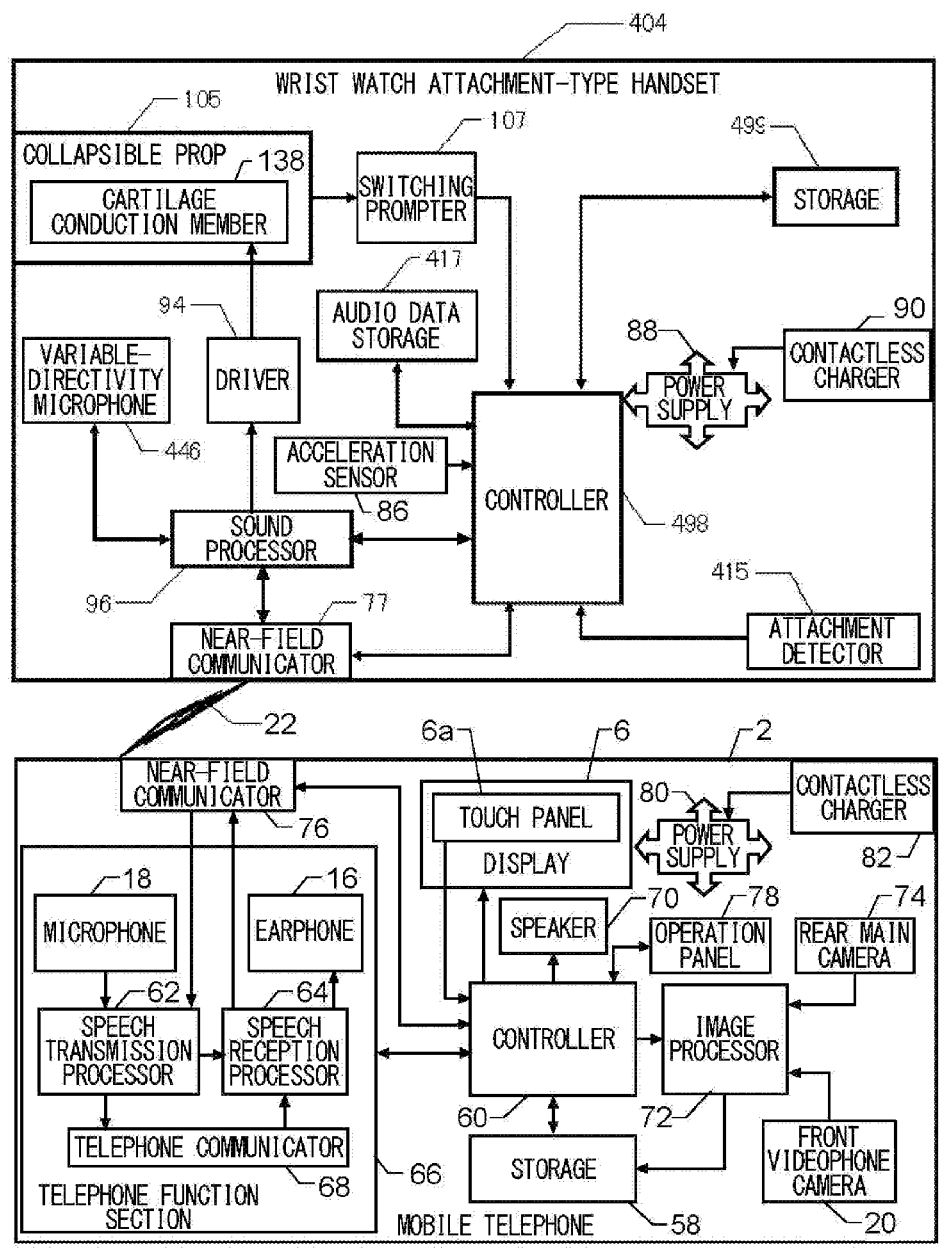
FIG. 13 is a system block diagram of Embodiment 5.

FIG. 13 is a system block diagram of Embodiment 5 shown in FIG. 12. As mentioned above, except that Embodiment 5 is a wrist watch attachment-type handset, it shares common features with Embodiment 2, and thus its system block diagram has much in common with that of Embodiment 2. Embodiment 5 has no functions for a wrist watch and exclusively has functions needed for a handset and an incoming-call vibrator relying on cartilage conduction. Accordingly, the configuration shown in FIG. 13 is simpler than the configuration of Embodiment 2 shown in FIG. 9. Even so, such parts in FIG. 13 as are identified by the same reference signs as in FIG. 9 are similar to those in Embodiment 2, and therefore no overlapping description will be repeated unless necessary.

FIG. 13 differs from FIG. 9 in the following aspects. An attachment detector 415 detects the wrist watch attachment-type handset 404 being attached to the wrist watch 400; it then turns the power ON automatically, and establishes near-field communication with the mobile telephone 2 automatically. It is also possible to turn ON and OFF the power and to establish near-field communication by separate manual operations.

As in Embodiment 2, in Embodiment 5 in FIG. 13, the vibration of the cartilage conduction member 138 is used as a vibration source for both cartilage conduction and an incoming-call vibrator. Specifically, with the collapsible prop 105 in the retracted state as shown in FIG. 12(B), the vibration of the cartilage conduction member 138 is used as a vibration source for a incoming-call vibrator. In Embodiment 5, on sensing the vibration of the incoming-call vibrator at the wrist, the user, without raising the collapsible prop 105, that is, while leaving it in the state shown in FIG. 12(B), can put the thumb on the tragus as shown in FIG. 3(B). This change in posture is detected by the acceleration sensor 86. Notified of the detection by the acceleration sensor 86, a controller 498 switches the vibration of the cartilage conduction member 138 from vibration for an incoming-call vibrator to cartilage conduction vibration based on electronic voice in an audio data storage 417. As a result, vibration conveying a brief voice message such as "a call from Mr. X" conducts from the cartilage conduction member 138 to the wrist. This vibration conducts farther from the wrist to the thumb, and with the tip of the thumb put on the tragus, the user can hear the voice message by cartilage conduction. Thus, before raising the collapsible prop 105, the user can determine whether or not the call is from a person involved in an urgent matter and has to be responded to immediately.

To achieve that function, a storage 499 stores, in addition to operation programs and operation data for the entire wrist watch attachment-type handset 404, telephone directory data for the mobile telephone 2. The telephone directory data is updated as necessary by near-field communication with the mobile telephone 2. The audio data in the audio data storage 417 is coordinated with the telephone directory data in the storage 499, and is updated as necessary along with the telephone directory data. With this configuration, when the near-field communicator 77 receives from the mobile telephone 2 the ID of the person who has originated the call, it is checked against the telephone directory data in the storage 499, and the corresponding audio data is output from the audio data storage 417, so that the cartilage conduction member 138 is driven to produce sound.

As described above, in Embodiment 5, with the wrist watch attachment-type handset 404 attached to the belt 428 of an ordinary wrist watch 400, the user can sense an incoming call to the mobile telephone 2 as vibration at the wrist. Moreover, with the thumb put on the tragus, the user can know, in an easy way by cartilage conduction, who has originated the call. If the call needs to be responded to, the user can the raise collapsible prop 105 and engage in the call by cartilage conduction. In this way, all the necessary actions can be coped with without taking out the mobile telephone 2.

The various features of the embodiments described above can be implemented not only in those specific embodiments but also in any other embodiment so long as they provide their advantages. Moreover, the various features of the embodiments can be implemented with various modifications. Modified features can be implemented in appropriate combinations with each other and with unmodified features.

For example, in Embodiment 2, in a case where the collapsible prop 105 is formed of a plastic with a shape memory property, its shape in the raised state can be memorized so that it assumes that shape when left alone. Then, with the hooks 105d to 105g disengaged, the collapsible prop 105 automatically rises to the state in FIG. 8(D). The twist-bendable part and the foldable part can each be given a hinge structure and be fitted with a spring that biases it in the rising direction. Also with this design, with the hooks 105d to 105g disengaged, the collapsible prop 105 automatically rises to the state in FIG. 8(D).

In Embodiment 2, raising the cartilage conduction member 138 onto the thumb 103 requires unfolding at two places, and in Embodiment 3, raising the cartilage conduction member 238 onto the base of the thumb 103 requires unfolding at one place. This, however, is not meant to limit the folding structure. For example, so long as a necessary length can be secured, a configuration is also possible where raising a cartilage conduction member onto the thumb requires unfolding at one place, or depending on the retracting structure, a configuration is also possible where raising a cartilage conduction member onto the base of the thumb requires unfolding at a plurality of places. To permit a cartilage conduction member to be raised onto the base of the thumb, a support belt 305 like the one in Embodiment 4 may be adopted. In that case, considering an ample length that can be secured, the slide structure using the slit 313 may be omitted, so that only the structure for rotation between FIG. 11(D) and FIG. 11(E) is adopted.

Embodiment 6

Figure 14:
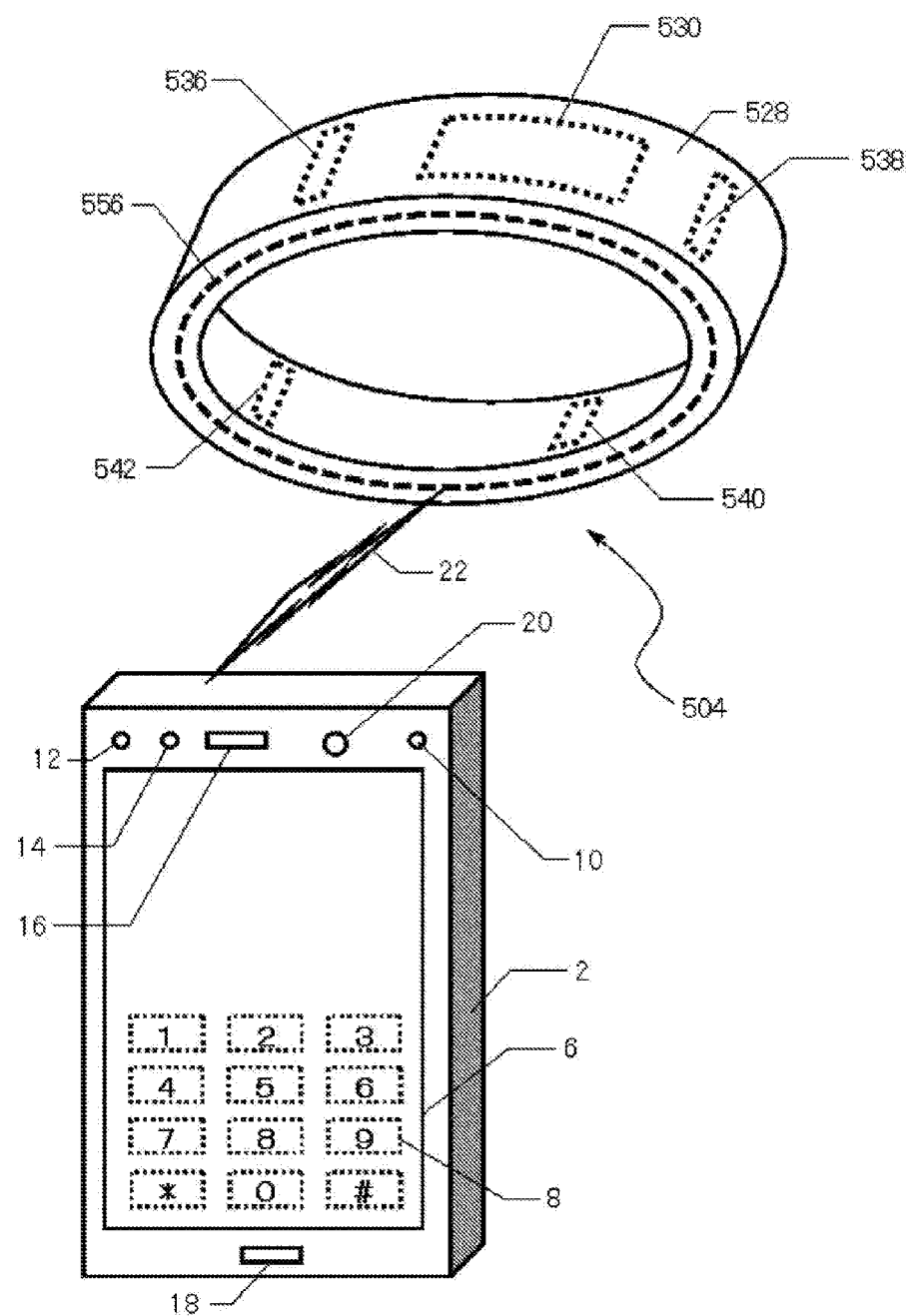
FIG. 14 is a perspective view showing a system configuration of a sixth embodiment (Embodiment 6) of the present invention.

FIG. 14 is a perspective view showing the system configuration of still another embodiment, Embodiment 6, of the present invention. Embodiment 6 is configured as a system comprising a mobile telephone 2 and a wristband-type handset 504. In Embodiment 6 in FIG. 14, the mobile telephone 2 has the same configuration as in Embodiment 1; therefore, common parts are identified by the same reference signs as in FIG. 1, and no overlapping description will be repeated. As in Embodiment 1, the mobile telephone 2 and the wristband-type handset 504 can communicate with each other by near-field communication such as Bluetooth (a registered trademark).

The wristband-type handset 504 according to Embodiment 6 has a belt 528, which is an elastic member formed of a material having an acoustic impedance similar to that of the wrist. The belt 528 is provided with vibration sources 536, 538, 540, and 542 each comprising a piezoelectric bimorph element or the like, so that incoming-call vibration as well as vibration for cartilage conduction is conducted from the reverse side of the belt 528 to the wrist. Thus, from the wristband-type handset 504, incoming-call vibration as well as vibration for cartilage conduction is conducted over a large area around the wrist. A configuration like this, where vibration is conducted from around the wrist over a large area, is effective in absorbing differences in the position suitable for vibration conduction among individual users, displacements of the wristband-type handset 504 while it is being worn, and so forth. Moreover, conducting vibration from around the wrist over a large area also helps conduct incoming-call vibration as well as vibration for cartilage conduction to the arm more effectively. Depending on the design, incoming-call vibration as well as vibration for cartilage conduction can be conducted over a large area around the wrist with the vibration of the entire belt 528. This makes it possible to adopt a simple configuration with a reduced number of vibration sources as necessary (with a single vibration source at the minimum).

For cartilage conduction, the vibration sources 536, 538, 540, and 542 are vibrated in a frequency range of an audio signal (frequencies around 1000 Hz), and the vibration is conducted to the wrist with a frequency range that arouses the sense of vibration (e.g., 20 Hz or less) cut off so that no uncomfortable vibration is sensed at the wrist. On the other hand, when vibrated as an incoming-call vibrator, the vibration sources 536, 538, 540, and 542 are vibrated in and around a frequency range that arouses the sense of vibration (e.g., 20 Hz or less) with an audible frequency range cut off so that the vibration is not heard by someone around. Along the belt 528, an antenna 556 of an near-field communicator is provided so as to be wound around the wrist. These features are common to Embodiment 1. The driving of the vibration sources 536, 538, 540, and 542 and the near-field communication with the mobile telephone 2 via the antenna 556 are performed by a circuit unit 530.

In Embodiment 6 configured as described above, when the mobile telephone 2 receives an incoming call or the like, the vibration sources 536, 538, 540, and 542 start to vibrate in a frequency range that arouses the sense of vibration, and the vibration is conducted to the wrist. The user can thus notice the incoming call. Next, when the user needs more information, the user assumes any posture, like those in FIGS. 2(B), 3(B), 4(A), and 4(B), in which a finger or hand is put in contact with the ear cartilage. This change in posture is automatically detected by an acceleration sensor provided in the circuit unit 530. As a result, the vibration of the vibration sources 536, 538, 540, and 542 is switched to a frequency range of an audio signal, and information about the other side based on audio data previously stored in the circuit unit 530 is output as sound vibration. Thus, with a finger or hand put in contact with the ear cartilage, by cartilage conduction, the user can obtain information as to who has originated the call, whether the call is a voice call or a text message (mail), and so forth. The cartilage conduction vibration output is, for example, an announcement such as "a phone call from Mr. Yamada" or "a text message from Mr. Suzuki". Once an announcement is started, it is repeated until the user makes, on the mobile telephone 2, an operation to start the call or an operation to stop vibration manually.

Vibration in a frequency range that arouses the sense of vibration, and vibration in a frequency range of an audio signal, can be started in response to near-field communication with the mobile telephone 2 not only on receiving an incoming call but also on starting communication with the mobile telephone 2 with any unread text message received before the start of communication, on detecting low battery on the mobile telephone 2, on detecting the mobile telephone 2 having moved out of the telephone service area, and so forth. When the wristband-type handset 504 has low battery, the just-mentioned vibration can be started under the control of the controller of the wristband-type handset 504 itself. The user can recognize the causes of the vibration in those different occasions by assuming, as described above, any posture, such as those in FIGS. 2(B), 3(B), 4(A), and 4(B), in which a finger or hand is put in contact with the ear cartilage.

Figure 15:
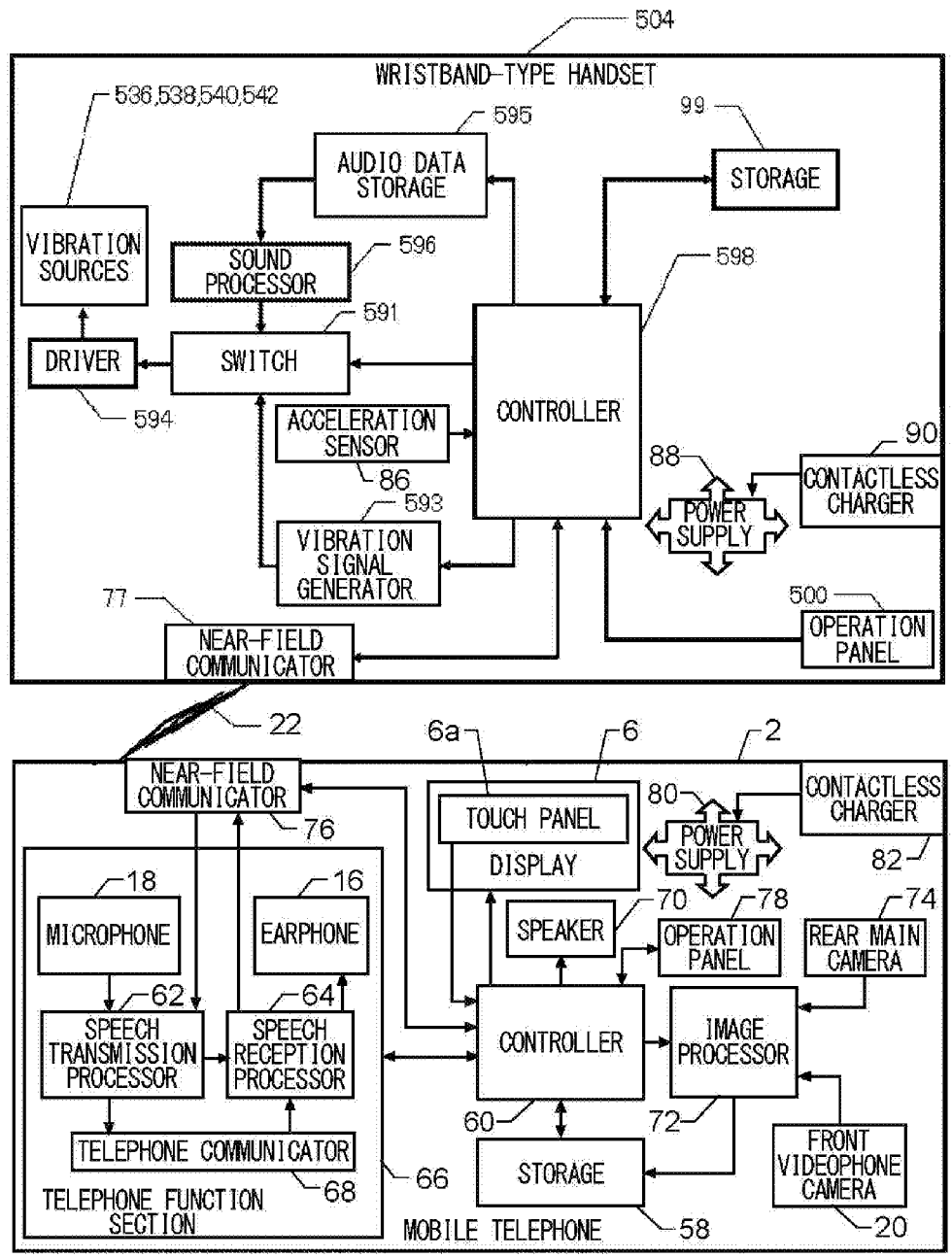
FIG. 15 is a block diagram of Embodiment 6.

FIG. 15 is a block diagram of Embodiment 6 shown in FIG. 14, and there, such parts as appear also in FIG. 1 are identified by the same reference numerals as in FIG. 1, and no overlapping description will be repeated unless necessary. Except for the vibration sources 536, 538, 540, and 542, the block of the wristband-type handset 504 in FIG. 15 corresponds to the details of the circuit unit 530 in FIG. 14. The block of the mobile telephone 2 is the same as in FIG. 5; therefore, the same parts are identified by the same reference numerals, and no description will be repeated.

The wristband-type handset 504 has a near-field communicator 77 for communication with the mobile telephone 2. In Embodiment 6, conveyed from the mobile telephone 2 via the near-field communicator 77 is one of the following pieces of information: the fact that there is an incoming call; whether or not the call is a voice call or a text message; the identity of the person who is originating the voice call or the text message; the fact that the battery is low on the mobile telephone 2; and the fact that the mobile telephone 2 is outside the telephone service area. In response, the vibration sources 536, 538, 540, and 542 start to be vibrated. Between the mobile telephone 2 and the wristband-type handset 504, information is exchanged via the near-field communicator 77 to share telephone directory information. When a new item of telephone directory information is added on the mobile telephone 2, it is conveyed via the near-field communicator 77 to the wristband-type handset 504, and is stored in the storage 99. In this way, information about the person who is originating a voice call or a text message is, as simple ID information, conveyed from the mobile telephone 2 to the wristband-type handset 504, and is checked against the previously stored telephone directory information. This makes it possible to make an announcement about the person who is originating a voice call or a text message.

The wristband-type handset 504 is controlled by a controller 598. In an initial state, that is, in a state where the main power has just been turned ON on an operation panel 500, the controller 598 selects, via a switch 591, a vibration signal generator 593 to make, via a driver 594, the vibration sources 536, 538, 540, and 542 vibrate in a frequency range that arouses the sense of vibration. Accordingly, when one of an incoming-call signal, a telephone directory ID of the person who is originating the voice call or the text message, a signal indicating the presence of an unread text message, an indication of low battery on the mobile telephone 2, and an indication of the mobile telephone 2 being outside the telephone service area is conveyed from the mobile telephone 2 via the near-field communicator 77, vibration based on the vibration signal generator 593 is generated.

On the other hand, when a change in posture is detected by the acceleration sensor 86, the switch 591 selects, via the switch 591, an audio processor 596. Then, audio data stored in an audio data storage 595 is processed by the audio processor 596, and based on its output, the vibration sources 536, 538, 540, and 542 are vibrated via the driver 594. Thus, an announcement can be heard by cartilage conduction via a hand or finger put in contact with the ear cartilage. The audio data to be processed by the audio processor 596 is selected by the controller 598 based on the information conveyed from the mobile telephone 2.

Figure 16:
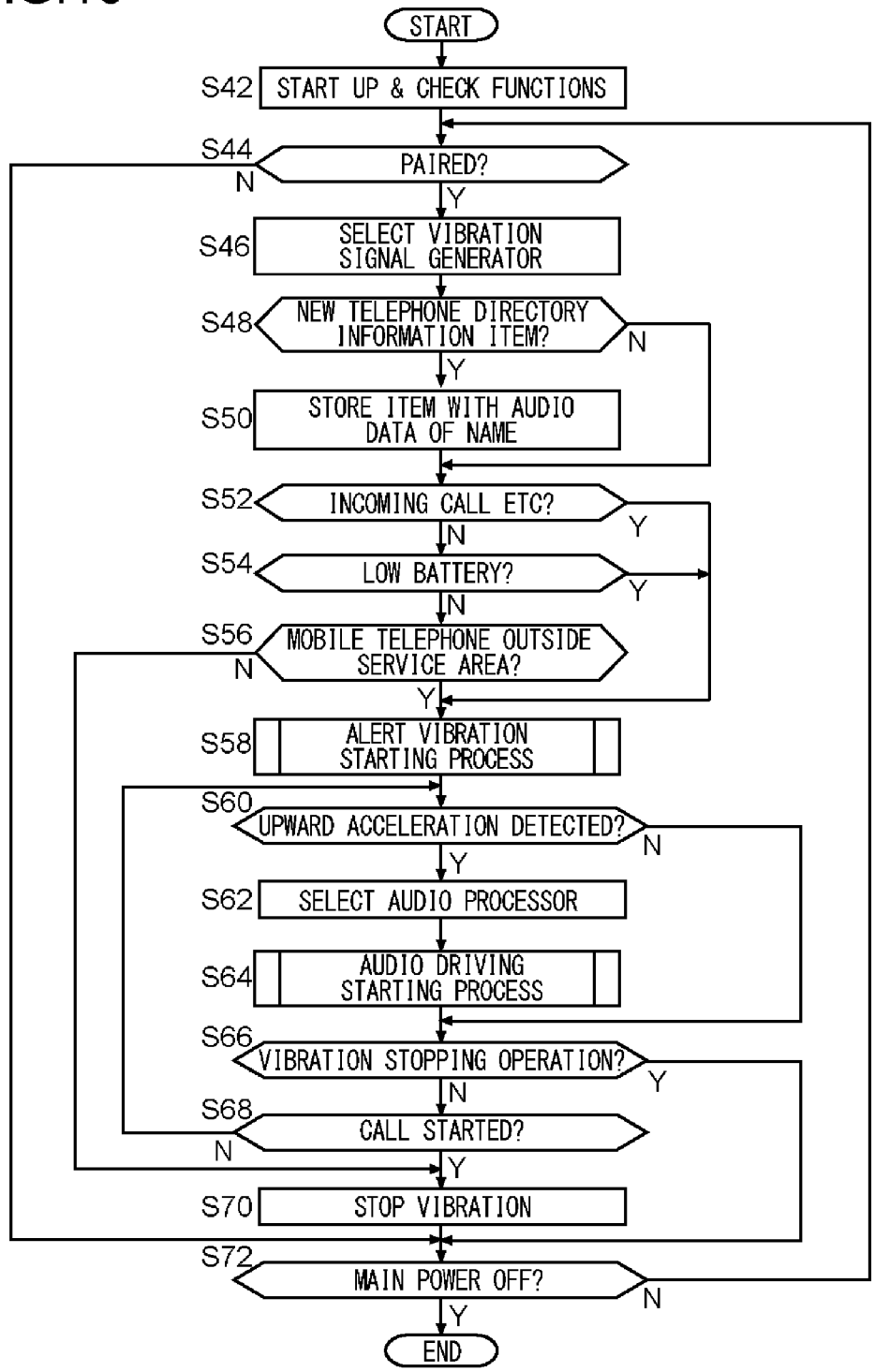
FIG. 16 is a flow chart showing the function of a controller of a wristband-type handset in Embodiment 6.

FIG. 16 is a flow chart showing the function of the controller 598 of the wristband-type handset 504 in Embodiment 6. The flow in FIG. 6 starts when the main power is turned ON on the operation panel 500 of the wristband-type handset 504. At step S42, a start-up procedure is gone through, and the functions of relevant blocks are checked. Next, at step S44, it is checked whether or not the wristband-type handset 504 and the mobile telephone 2 are in a mutually communicable state (whether or not they are paired together), and if so, the flow proceeds to Step S46.

At step S46, the vibration signal generator 593 is selected. Then, at step S48, it is checked whether or not a new item of telephone directory information has been received from the mobile telephone 2. If a new item of telephone directory information has been received, then, at step S50, the new item of telephone directory information is stored in the storage 99, and audio data for reading aloud the name of a person in the new item of telephone directory information is created and stored, along with a telephone directory ID, in the audio data storage 595, the flow then proceeding to Step S52. If, at step S48, no new item of telephone directory information is detected having been received, the flow proceeds directly to Step S52.

At step S52, whether or not there is an incoming call or the like is checked. Here, "an incoming call or the like" can be a voice call or a text message that is being received or a text message that was received in the past and has been left unread up to the time point that step S52 is reached as a result of a pair being newly established at step S44. If there is no incoming call or the like, then, at step S54, it is checked whether or not the battery is low on the mobile telephone 2 proper or on the wristband-type handset 504. If neither is the case, then, at step S56, it is checked whether or not the mobile telephone 2 proper has moved out of the telephone service area.

If, at step S52, there is an "incoming call or the like", or if, at step S54, a battery is detected being low, or if, at step S56, the mobile telephone 2 proper is detected having moved out of the telephone service area, then the flow proceeds to Step S58. At step S58, an alert vibration starting process is performed to make the vibration sources 536, 538, 540, and 542 vibrate based on a vibration signal from the vibration signal generator 593. The process will be described in detail later. On completion of the alert vibration starting process, the flow proceeds to Step S60.

At step S60, it is checked whether or not the acceleration sensor 86 has detected an upward acceleration as the user moves a hand to assume a posture for putting a finger or hand on the ear cartilage. If an upward acceleration is detected, then, at step S62, the switch 591 is instructed to perform switching to select the audio processor 596, the flow then proceeding to Step S64. At step S64, an audio driving starting process is performed to make an announcement based on an audio signal from the audio processor 596. The process will be described in detail later. On completion of the audio driving starting process, the flow proceeds to Step S66. If, at step S60, no upward acceleration is detected, the flow proceeds directly to Steps S66. In this case, no switching from the vibration signal generator 593 to the audio processor 596 is performed, and thus vibration is continued in a frequency range that arouses the sense of vibration.

At step S66, it is checked whether or not a manual vibration stopping operation has been made on the operation panel 500. If no vibration stopping operation is detected, then, at step S68, it is checked whether or not a call starting operation has been made on the mobile telephone 2 proper. If, at Step S66, a vibration stopping operation is detected, or if a call starting operation is detected having made on the mobile telephone 2 proper, then, at step S70, vibration based on an audio signal or vibration in a frequency range that arouses the sense of vibration is stopped, and the flow proceeds to Step S72. If, at step S56, the mobile telephone 2 proper is not detected having moved out of the telephone service area, the flow proceeds directly to Step S70. Here, if there is no vibration, nothing is done at step S70, and the flow proceeds to Step S72. On the other hand, if, at step S68, no call staring operation is detected on the mobile telephone 2 proper, the flow returns to Step S60, and thereafter, until a vibration stopping operation is detected at step S66, or until a call starting operation is detected on the mobile telephone 2 proper at step S68, Steps S60 through S68 are repeated. Meanwhile, vibration in a frequency range that arouses the sense of vibration or, if switching has taken place, vibration based on an announcement signal from the audio processor 596 is continued.

Incidentally, if, at step S44, no pair is detected having been established (including when one has been unpaired), the flow immediately proceeds to Step S72. At step S72, it is checked whether or not the main power has been turned OFF on the operation panel 500, and if the main power is detected having been turned OFF, the flow ends. On the other hand, if, at step S72, the main power is not detected having been turned OFF, then the flow returns to Step S44, so that thereafter, until the main power is detected having been turned OFF at step S72, Steps S44 through S72 are repeated. In this way, a newly established pair is coped with and, if a pair has already been established, various changes in situation that require new generation of vibration are coped with.

Figure 17:
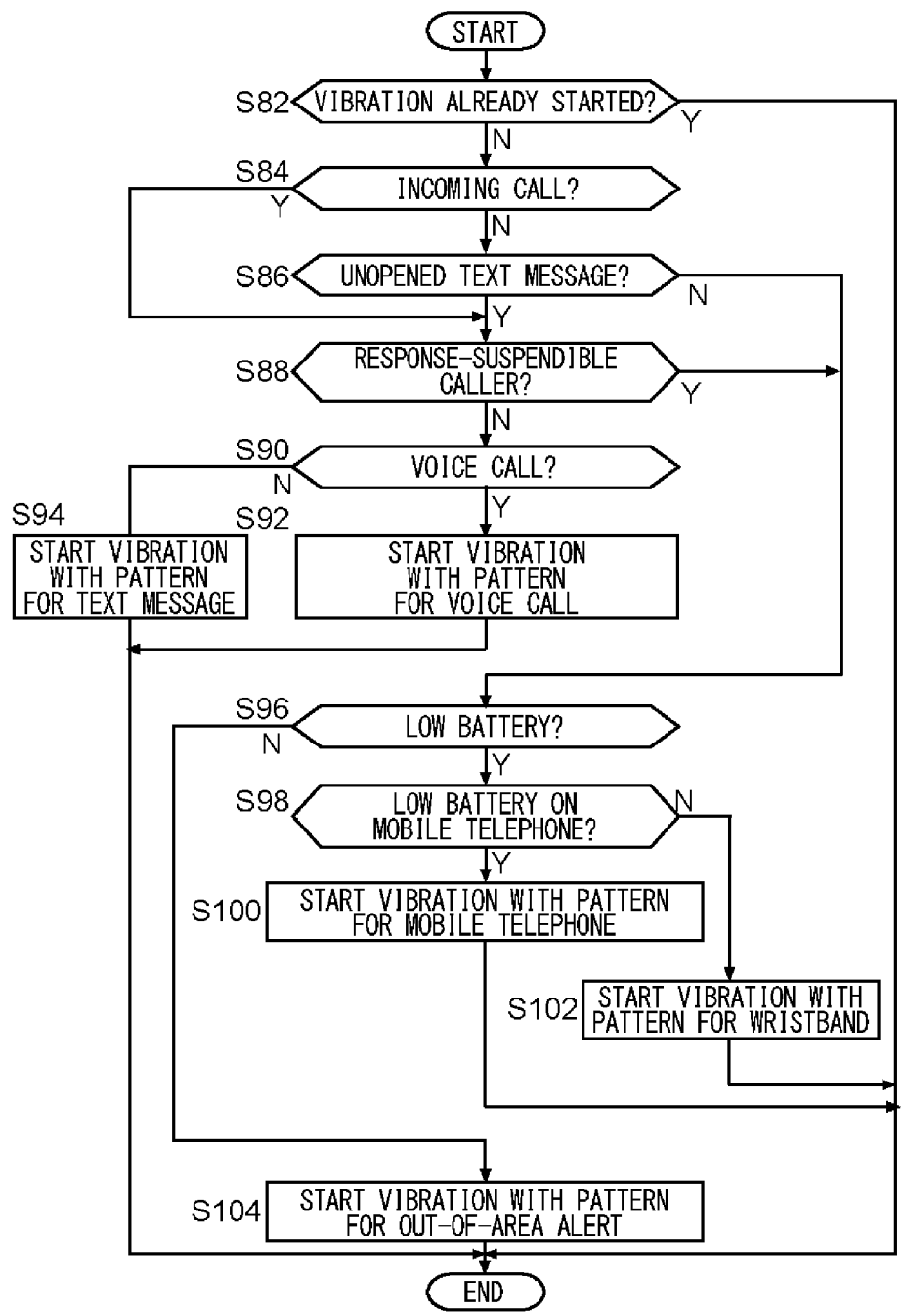
FIG. 17 is a flow chart showing the details of step S58 in FIG. 16.

FIG. 17 is a flow chart showing the details of the alert vibration starting process at step S58 in FIG. 16. When the alert vibration starting process starts, at step S82, whether or not vibration has already been started is checked. If vibration has already been started, the flow immediately ends, and the flow in FIG. 16 is resumed from Step S60. If no vibration has yet been started, then, at Step S84, it is checked whether or not an incoming call has been received. If no incoming call has been received, then, at Step S86, it is checked whether or not there is any unopened text message. Step S86 allows detection of a text message that was received before establishment of a pair and has been left unread since. If, at Step S84, an incoming call is detected, or if, at Step S86, an unopened text message is detected, the flow proceeds to Step S88.

At Step S88, it is checked whether or not the other side is a "response-suspendible caller", that is, a person from whom an incoming call does not need to be responded to immediately. If not, the flow proceeds to Step S90. A person who does not require so much attention as to rely on the wristband-type handset 504 can be, even if an incoming call from him or her is missed, coped with later with reference to an incoming-call history. Thus, by classifying a person who is not involved in an urgent matter as a response-suspendible caller, it is possible to avoid the annoyance of the wristband-type handset 504 vibrating unnecessarily.

At Step S90, it is checked whether the incoming call is a voice call. If it is a voice call, then, at Step S92, incoming-call alert vibration is started with a pattern that indicates a voice call, and the flow ends. On the other hand, if, at Step S90, the incoming call is not detected being a voice call, it means that it is a text message; thus then, at Step S94, incoming-call alert vibration is started with a pattern that indicates a text message, and the flow ends.

If, at Step S86, no unopened text message is detected, the flow proceeds to Step S96. Even if, in Step S84, an incoming call is detected or, at Step S86, an unopened text message is detected, if, at Step S88, it is detected being from a response-suspendible caller, the flow proceeds to Step S96. In this way, it is possible to avoid the wristband-type handset 504 vibrating unnecessarily for a person who is not involved in an urgent matter.

At Step S96, it is checked whether or not the battery is low on the mobile telephone 2 proper or on the wristband-type handset 504. If either is the case, then, at Step S98, whether or not the battery of the mobile telephone 2 proper is low is checked. If the battery of the mobile telephone 2 proper is low, then, at Step S100, low battery alert vibration is started with a pattern indicating that the battery of the mobile telephone 2 proper is low, and the flow ends. On the other hand, if, at Step S98, the battery of the mobile telephone 2 proper is not detected being low, it means that the battery of the wristband-type handset 504 is low; thus then, at Step S102, low battery alert vibration is started with a pattern indicating that the battery of the wristband-type handset 504 is low, and the flow ends.

If, at Step S96, no low battery is detected, it means that the flow in FIG. 17 has started so as to correspond to Step S56 in FIG. 16. Accordingly, in this case, the flow proceeds to Step S104, where out-of-service-area alert vibration is started with a pattern indicating that the mobile telephone 2 proper is outside the telephone service area, and then flow ends. In either case, on completion of the flow in FIG. 17, the flow in FIG. 16 is resumed from Step S60. The alert vibration starting process described above permits the user to recognize the cause that has started vibration.

Figure 18:
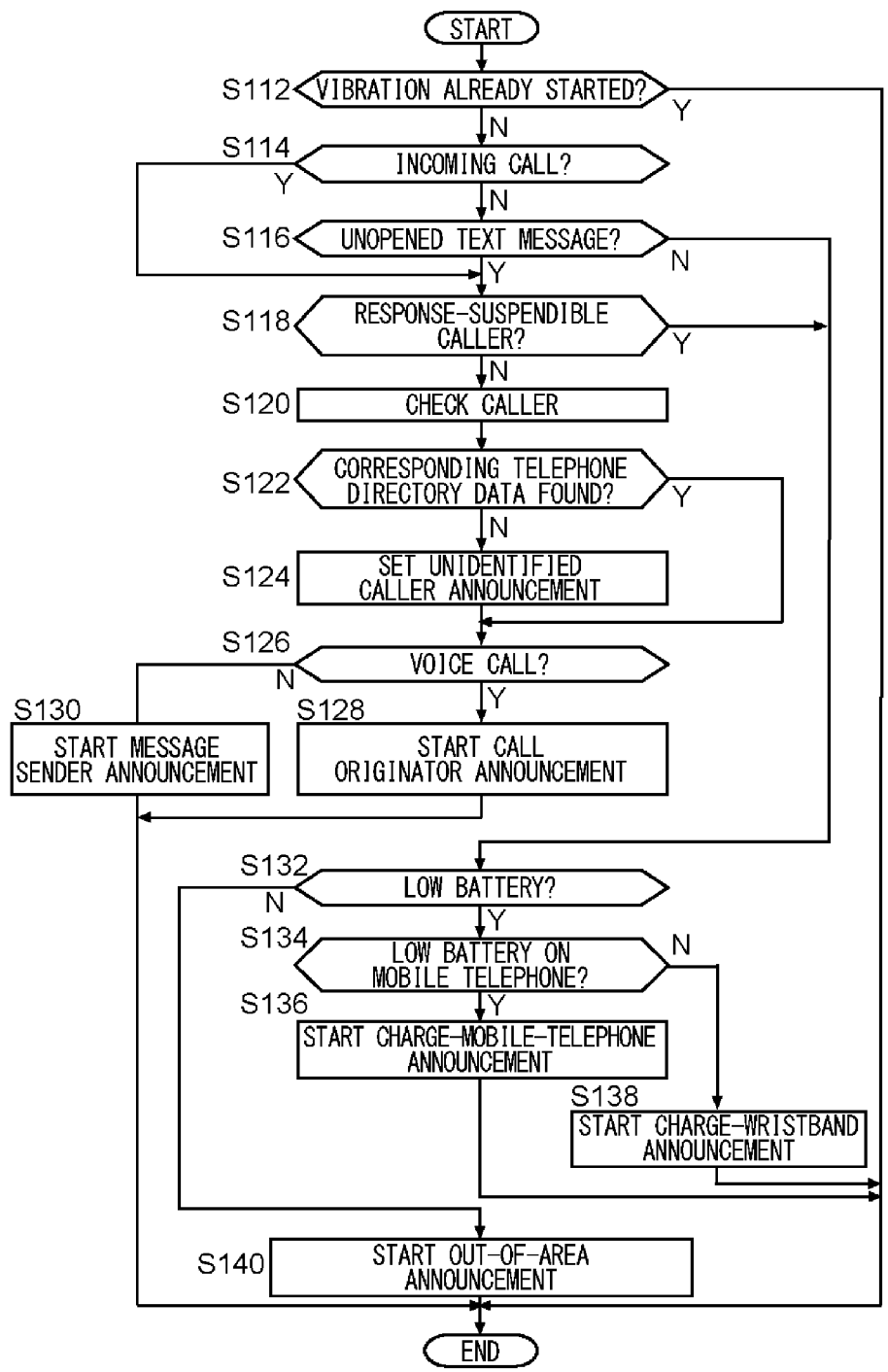
FIG. 18 is a flow chart showing the details of step S64 in FIG. 16.

FIG. 18 is a flow chart showing the details of the audio driving starting process at Step S64 in FIG. 16. When the audio driving starting process starts, at Step S112, it is checked whether or not vibration has already been started. If vibration has already been started, the flow immediately ends, and the flow in FIG. 16 is resumed from Step S66. If no vibration has yet been started, then, at Step S114, it is checked whether or not the flow in FIG. 18 has started in response to an incoming call. If not, then, at Step S116, it is checked whether or not the flow in FIG. 18 has started on detection of an unopened text message. If the check at either Step S114 or Step S116 results YES, the flow proceeds to Step S118.

At Step S118, it is checked whether or not the other side is classified as a "response-suspendible caller". If not, the flow proceeds to Step S120. At Step S120, the ID of the other side notified from the mobile telephone 2 is checked against the telephone directly data stored in the storage 99. Then, at Step S122, it is checked whether or not there is any telephone directory data in the storage 99 which corresponds to the other side. If there is no such telephone directory data, then, at Step S124, an announcement indicating that the person who has originated a voice call or a text message is unidentified is set, and the flow proceeds to Step S126. An unidentified caller can be a troublesome one, but can also be one that will turn out to be important in the future or one that is in fact important but has somehow been left out of the telephone directory data, and thus the announcement is made after Step S126. Out of similar consideration, in FIG. 17, a caller that is not in the telephone directory data cannot be classified as a response-suspendible caller, and thus the flow proceeds to alerting by vibration. If, at Step S122, there is telephone directory data in the storage 99 which corresponds to the caller, the flow proceeds directly to Step S126.

At Step S126, it is checked whether or not the incoming call is a voice call. If it is a voice call, then, at Step S128, a call originator announcement, such as saying "a phone call from Mr. Yamada" is started, and the flow ends. Here, if an unidentified caller announcement has been set at Step S124, an announcement like "a phone call from an unregistered caller" is made. Of such audio data, the part "a phone call from" is selected when the incoming call is a voice call, the part "Mr. Yamada", for instance, is selected according to the ID from the mobile telephone 2, and the part "an unregistered caller" is selected depending on the setting at Step S124.

On the other hand, if, at Step S126, the incoming call is not detected being a voice call, it means that the incoming call is a text message; thus then, at Step S130, a message sender announcement, such as saying "a text message from Mr. Suzuki" is started, and the flow ends. Here, if an unidentified caller announcement has been set at Step S124, an announcement like "a text message from an unregistered caller" is made. Of such audio data, the part "a text message from" is selected when the incoming call is a text message, the part "Mr. Suzuki", for instance, is selected according to the ID from the mobile telephone 2, and the part "an unregistered caller" is selected depending on the setting at Step S124.

If, at Step S116, no unopened text message is detected, the flow proceeds to Step S132. Even if, at Step S114, an incoming call is detected or, at Step S115, an unopened text message is detected, if, at Step S118, it is detected being from a response-suspendible caller, the flow proceeds to Step S132.

At Step S132, it is checked whether or not the flow in FIG. 18 has started as a result of low battery on mobile telephone 2 proper or on the wristband-type handset 504. If either is the case, then, at Step S134, it is checked whether or not the battery of the mobile telephone 2 proper is low. If the battery of the mobile telephone 2 proper is low, then, at Step S136, a telephone charge announcement, such as saying "charge the telephone", is started, and the flow ends. On the other hand, if, at Step S134, the battery of the mobile telephone 2 is not detected being low, it means that the battery of the wristband-type handset 504 is low; thus then, at Step S138, a wristband charge announcement, such as saying "charge the wristband", is started, and the flow ends.

If, at Step S132, no low battery is detected, it means that the flow in FIG. 18 has started so as to correspond to Step S56 in FIG. 16. Accordingly, in this case, the flow proceeds to S140, where an out-of-service-area announcement, such as saying "you have moved out of the telephone service area", is started, and the flow ends. In any case, when the flow in FIG. 18 ends, the flow in FIG. 16 is resumed from Step S66. In the audio driving starting process described above, by putting a hand or a finger on the ear cartilage on sensing incoming-call vibration, the user, even if he or she does not remember what causes are signified by which vibration patterns, can reliably recognize the cause of vibration from the announcement.

The various features of the embodiments described above can be implemented not only in those specific embodiments but also in any other embodiment so long as they provide their advantages. Moreover, the various features of the embodiments can be implemented with various modifications. Modified features can be implemented in appropriate combinations with each other and with unmodified features.

For example, Step S60 in FIG. 16, which is provided in Embodiment 6 to achieve switching to announcements, may be replaced with a step for checking whether or not a switch has been operated manually, instead of detecting an upward acceleration for automatic switching, or the flow may be configured such that the switching can be performed both automatically, on detecting an upward acceleration, and manually. The various features of Embodiment 6 can be implemented not only in a simple wristband having no watch functions but also in a wrist watch as in Embodiments 1 to 5 shown in FIGS. 1 to 13.

Moreover, in Embodiment 6, the alert vibration starting process may be simplified such that a single vibration pattern is used for all causes, or different vibration patterns are used only to distinguish whether the cause is an incoming call or anything else, with the cause of vibration announced in the audio driving starting process. Moreover, in Embodiment 6, a configuration is also possible where, when a manual vibration stopping operation is made on the operation panel 500 at Step S66 in FIG. 16, it is transmitted to the mobile telephone 2 so that, without the incoming call being responded to, communication is disconnected. In Embodiment 6, the vibration sources 536, 538, 540, and 542 are all shared for both incoming-call vibration driving and audio signal driving; instead, an ordinary eccentric-mass motor or the like may be adopted for dedicated use as an incoming-call vibration source, and a piezoelectric bimorph element may be adopted for dedicated use for audio signal driving, in which case a configuration is possible where, at Step S58 in FIG. 16, the eccentric-mass motor starts to be driven and, at Step S64 in FIG. 16, the eccentric-mass motor stops being driven and instead the piezoelectric bimorph element starts to be driven. Although Embodiment 6 is implemented as a wristband, its features may be implemented in a finger ring instead.

Overview

To follow is an overview of the features of various embodiments disclosed herein.

According to one embodiment disclosed herein, a wrist watch-type handset includes: a worn part worn on a wrist; a cartilage conduction vibration source provided in the worn part; a speaker; a variable-directivity microphone; and a controller for switching the directivity of the variable-directivity microphone according to which of the cartilage conduction vibration source and the speaker is used. Thus, the user can comfortably conduct both a call by cartilage-conducted sound and a call by air-conducted sound. According to a specific feature, the controller directs the directivity of the variable-directivity microphone toward the back of a hand when the speaker is used, and directs the directivity of the variable-directivity microphone toward the palm of the hand when the cartilage conduction vibration source is used.

According to another embodiment disclosed herein, a wrist watch-type handset includes: a worn part worn on a wrist; a cartilage conduction vibration source provided in the worn part; and a presenting means for presenting information explaining a method of use involving putting the hand on which the worn part is worn in contact with an ear cartilage. Thus, the user can enjoy the benefits of cartilage conduction without confusion. According to a specific feature, the presenting means is a means for displaying information on a speech-transmitting and -receiving method. According to another specific feature, the presenting means is an instruction manual medium containing information on a speech-transmitting and -receiving method. According to yet another specific feature, the presenting means is an advertisement medium containing information on a speech-transmitting and -receiving method.

According to another feature of one embodiment disclosed herein, a wrist watch-type handset includes: a worn part worn on a wrist; a cartilage conduction vibration source provided in the worn part; and a conducting part for conducting vibration of the cartilage conduction vibration source to around the wrist. Thus, suitable vibration can be conducted to the wrist irrespective of differences among individual users and displacements of the handset worn.

According to another feature of one embodiment disclosed herein, a wrist watch-type handset includes: a worn part worn on a wrist; and a cartilage conduction vibration source provided in the worn part. The cartilage conduction vibration source is used also as a vibration source for an incoming-call vibrator, and when it is vibrated for cartilage conduction, the vibration component in a low frequency range arousing the sense of vibration is cut off. Thus, cartilage conduction can be achieved without causing an uncomfortable sense of vibration.

According to a specific feature, when the cartilage conduction vibration source is vibrated for the incoming-call vibrator, the vibration component in an audible frequency range is cut off. Thus, the user can sense an incoming call without someone around noticing it.

According to another specific feature, a limiter is provided for inhibiting vibration exceeding the intensity low enough not to arouse the sense of vibration when the cartilage conduction vibration source is vibrated for cartilage conduction. Thus, cartilage conduction can be achieved without causing an uncomfortable sense of vibration.

According to another feature of one embodiment disclosed herein, a wrist watch-type handset includes: a worn part worn on a wrist; a cartilage conduction vibration source provided in the worn part; a microphone; and a buffer segment for preventing conduction of vibration between the cartilage conduction vibration source and the variable-directivity microphone. Thus, satisfactory cartilage conduction can be achieved without the microphone collecting vibration.

According to one embodiment disclosed herein, a method for receiving speech includes: holding a cartilage conduction member between the ball of a thumb and a tragus with the back of a hand pointing frontward to conduct vibration of the cartilage conduction member to the tragus so that sound is heard by cartilage conduction. Thus, the user can receive speech by cartilage conduction in a natural posture similar to that in telephone conversation with a gesture.

According to a specific method, the worn part worn on the wrist is used to support the cartilage conduction member on the worn part. Thus, the user can receive speech by cartilage conduction in a wearable fashion. According to a more specific method, a support part for supporting the cartilage conduction member with a fulcrum at the worn part is held between the base of the thumb and the forefinger. Thus, natural, stable cartilage conduction can be achieved.

According to another specific method, the cartilage conduction member, when not in contact with the tragus, is laid along the worn part. Thus, the user can be ready for cartilage conduction in a wearable fashion without feeling awkward when not using it. According to a more specific method, the cartilage conduction member folded up into the worn part is used as a vibration source for an incoming-call vibrator. Thus, the cartilage conduction member can be used effectively even when not used as such.

According to another method based on one embodiment disclosed herein, vibration is conducted to a thumb, and, with the back of a hand pointing frontward, the thumb is put in contact with a tragus to conduct the vibration to the tragus so that sound is heard by cartilage conduction. According to a specific method, the vibration is conducted to the thumb by conducting vibration to the wrist from a cartilage conduction vibration source provided in a worn part worn on the wrist. According to another specific method, the vibration is conducted to the thumb by putting in contact with the thumb a cartilage conduction member supported on a worn part. Also with these methods, the user can receive speech by cartilage conduction in a natural posture similar to that in telephone conversation with a gesture. According to a more specific method based on the latter method, the vibration is conducted to the thumb by putting the cartilage conduction member in contact with the base of the thumb. According to a further specific method, the cartilage conduction member is held between the base of the thumb and the forefinger. Thus, natural, stable cartilage conduction can be achieved.

According to another feature of one embodiment disclosed herein, a handset includes: a worn part worn on a wrist; a support part raisable along an inner side of a thumb with a fulcrum at the worn part; and a cartilage conduction member supported on the support part. Thus, the user can receive speech by cartilage conduction in a wearable fashion. According to a specific feature, the support part is movable between a raised position where it rises along the inner side of the thumb and a retracted position where it lies along the worn part. Thus, the user can be ready for cartilage conduction in a wearable fashion without feeling awkward when not using it. According to a more specific feature, the support part is foldable in the retracted position. According to a more detailed feature, the support part is formed of a shape memory material. According to another more specific feature, the support part is so structured as to be wound around the outer circumference of the worn part. According to a more detailed feature, the support part is slidable relative to the worn part between the raised position and the retracted position.

According to another specific feature of one embodiment disclosed herein, the support part permits the cartilage conduction member to rise onto the ball of the thumb. According to another specific feature, the support part permits the cartilage conduction member to rise onto the base of the thumb According to another specific feature, a handset disclosed herein has a near-field communicator, for communication with a mobile telephone, and a microphone, and is configured as a wrist watch. According to yet another specific feature, a handset disclosed herein has a near-field communicator, for communication with a mobile telephone, and a microphone, and is configured as an attachment for a wrist watch.

According to one embodiment disclosed herein, an alerting device wearable on the human body includes: a storage for previously storing a plurality of pieces of alert audio data; a vibration source for vibrating for cartilage conduction; a near-field communicator for receiving an instruction signal from a mobile telephone; and a controller for selecting, according to the instruction signal received by the near-field communicator, a corresponding piece of alert audio data stored in the storage, and for making the vibration source vibrate in a frequency range of an audio signal for cartilage conduction according to the selected piece of alert audio data. Thus, the user can confirm the specific content of a notification by cartilage conduction on the basis of the instruction signal received from the mobile telephone.

According to a specific feature, an alerting device disclosed herein is configured as a wristband. More specifically, the wristband is formed of a material having an acoustic impedance similar to that of the wrist. The wristband may instead be formed of an elastic material, Thus, vibration of the vibration source can be conducted to the wrist effectively.

According to another specific feature, an alerting device disclosed herein is controlled by the controller so as to produce alert vibration in a frequency range arousing the sense of vibration according to the instruction signal received by the near-field communicator. Thus, the user can confirm the specific content of a notification by cartilage conduction on the basis of the instruction signal received from the mobile telephone, and can also recognize the receipt of the instruction signal by the sense of vibration based on the instruction signal from the mobile telephone. According to a more specific feature, the vibration source for cartilage conduction is used also as a vibration source for the alert vibration. According to another more specific feature, a vibration source for the alert vibration is provided separately from the vibration source for cartilage conduction.

According to another more specific feature, an alerting device disclosed herein first produces alert vibration in a frequency range arousing the sense of vibration according to the instruction signal received by the near-field communicator, and then switches to vibration by the vibration source based on the audio data in a frequency range of an audio signal in order to allow the user to confirm the cause of the alert vibration. Specifically, the instruction signal is an incoming-call signal indicating that the mobile telephone has received an incoming call. According to a more specific feature, the instruction signal contains information about the caller the incoming call is from, and the audio data contains an announcement about the caller. According to yet another specific feature, the instruction signal contains information indicating whether the incoming call is a voice call or a text message, and the audio data contains an announcement indicating whether the incoming call is a voice call or a text message.

According to another feature of one embodiment disclosed herein, an alerting device includes: a storage; a vibration source; a near-field communicator for receiving an incoming-call signal from a mobile telephone; and a controller for making the vibration source vibrate according to the incoming-call signal received by the near-field communicator. A particular communication partner can be previously stored in the storage so that, if the incoming-call signal contains information about the particular communication partner, even when the incoming-call signal is received from the mobile telephone, the vibration source is not vibrated. Thus, the user can avoid the annoyance of the vibration source vibrating for a partner that does not require an urgent response.

According to another feature of one embodiment disclosed herein, an alerting device wearable on the human body includes: a vibration source; a near-field communicator for receiving from a mobile telephone information indicating that the mobile telephone has low battery; and a controller for making the vibration source vibrate according to the information received by the near-field communicator. Thus, the user can recognize that the mobile telephone has low battery on the basis of the instruction signal received from the mobile telephone. According to a specific feature, the controller makes the vibration source vibrate with a particular pattern indicating that the mobile telephone has low battery.

According to another feature of one embodiment disclosed herein, an alerting device wearable on the human body includes: a vibration source; a near-field communicator for receiving from a mobile telephone information indicating that the mobile telephone is located outside the telephone service area; and a controller for making the vibration source vibrate according to the information received by the near-field communicator. Thus, the user can recognize that the mobile telephone is located outside the telephone service area on the basis of the instruction signal received from the mobile telephone. According to a specific feature, the controller makes the vibration source vibrate with a particular pattern indicating that the mobile telephone is located outside the telephone service area.

INDUSTRIAL APPLICABILITY

The present invention finds applications in wrist watch-type and wrist watch attachment-type handsets. The present invention finds applications also in alerting devices that operate in coordination with mobile telephones.

LIST OF REFERENCE SIGNS 28, 30, 41 worn part
36, 38, 40 cartilage conduction vibration source
32 speaker
46 variable-directivity microphone
98 controller
28 belt
26 wrist watch body
41 conducting part
42 adjusting means
96 limiter
52, 54 buffer segment
138, 238, 338 cartilage conduction member
128, 328, 428 worn part worn on a wrist
105, 205, 305 support part
36, 38, 40 cartilage conduction vibration source
104, 204, 304 wrist watch
404 attachment for a wrist watch
98 storage
536, 538, 540, 542 vibration source
22 instruction signal
77 near-field communicator
598 controller
528 wristband

The invention claimed is:

1. A wristband-type handset, comprising:
a worn part to be worn on a wrist;
a cartilage conduction vibration source provided in the worn part configured to conduct vibration to the wrist;
a speaker configured to generate air-conducted sound;
a variable-directivity microphone; and
a controller operable for switching directivity of the variable-directivity microphone according to whether the cartilage conduction vibration source is used in combination with the variable-directivity microphone or whether the speaker is used in combination with the variable-directivity microphone,
wherein the cartilage conduction vibration source also is operable to be used as a vibration source for an incoming-call vibrator, and
when the cartilage conduction vibration source is vibrated for cartilage conduction, a vibration component in a low frequency range arousing a sense of vibration is cut off.

2. The wristband-type handset of claim 1, wherein the controller directs the directivity of the variable-directivity microphone toward a back of a hand when the speaker is used, and directs the directivity of the variable-directivity microphone toward a palm of the hand when the cartilage conduction vibration source is used.

3. The wristband-type handset of claim 1, wherein the wristband-type handset is offered along with explanatory information explaining a method of use involving putting a hand on which the worn part is worn in contact with an ear cartilage.

4. The wristband-type handset of claim 3 further comprising a display, wherein the explanatory information is offered on the display as information on a speech-transmitting and -receiving method.

5. The wristband-type handset of claim 3, wherein
the explanatory information is offered in a form of an instruction manual medium containing information on a speech-transmitting and -receiving method.

6. The wristband-type handset of claim 3, wherein
the explanatory information is offered in a form of an advertisement medium containing information on a speech-transmitting and -receiving method.

7. The wristband-type handset of claim 1, wherein
vibration of the cartilage conduction vibration source is conducted to a thumb, and
with the back of the hand pointing frontward, the thumb is put in contact with a tragus to conduct the vibration of the cartilage conduction vibration source further to the tragus so that sound is heard by cartilage conduction.

8. The wristband-type handset of claim 1, further comprising:
a conducting part for conducting vibration of the cartilage conduction vibration source to around the wrist.

9. The wristband-type handset of claim 1, further comprising:
an adjuster configured to adjust a tightening force around the wrist, wherein the adjuster is configured to increase the tightening force when the cartilage conduction vibration source is used.

10. The wristband-type handset of claim 1, further comprising:
a buffer segment for preventing conduction of vibration between the cartilage conduction vibration source and the variable-directivity microphone.

11. A wristband-type handset, comprising:
a worn part to be worn on a wrist; and
a cartilage conduction vibration source provided in the worn part operable to produce vibration in an audible frequency range, wherein the cartilage conduction vibration source is operable to be used also as a vibration source for an incoming-call vibrator with a vibration component in a low frequency range arousing a sense of vibration, and wherein, when the cartilage conduction vibration source is vibrated for cartilage conduction, the vibration component in a low frequency range arousing a sense of vibration is cut off;
a storage for previously storing a plurality of pieces of information audio data;
a near-field communicator for receiving an instruction signal from a mobile telephone; and
a controller for selecting, according to the instruction signal received by the near-field communicator, a corresponding piece of information audio data stored in the storage, and making the cartilage conduction vibration source vibrate in a frequency range of an audio signal for cartilage conduction according to the selected piece of information audio data.

12. The wristband-type handset of claim 11, wherein
when the cartilage conduction vibration source is vibrated for the incoming-call vibrator, a vibration component in the audible frequency range is cut off.

13. The wristband-type handset of claim 11, further comprising:
a limiter for inhibiting vibration exceeding an intensity low enough not to arouse the sense of vibration when the cartilage conduction vibration source is vibrated for cartilage conduction.

14. A wristband-type informing device, comprising:
a storage for previously storing a plurality of pieces of information audio data shared with a mobile phone;
a vibration source operable for vibrating for cartilage conduction;
a near-field communicator operable for receiving an instruction signal from the mobile telephone to identify one of the plurality of pieces of information audio data in the storage; and
a controller operable for selecting, according to the instruction signal received by the near-field communicator, a corresponding piece of information audio data stored in the storage, and making the vibration source vibrate in a frequency range of an audio signal for cartilage conduction according to the selected piece of information audio data,
wherein the wristband-type informing device first produces alert vibration in the frequency range arousing the sense of vibration according to the instruction signal received by the near-field communicator, and then switches to vibration by the vibration source based on the information audio data in the frequency range of an audio signal in order to know a cause of the alert vibration.

15. The wristband-type informing device of claim 14, wherein
the wristband-type informing device is controlled by the controller so as to produce alert vibration in a frequency range arousing a sense of vibration according to the instruction signal received by the near-field communicator.

16. The wristband-type informing device of claim 14, wherein the instruction signal contains information indicating that a battery of the mobile telephone is low, and the audio data contains an announcement indicating that the battery of the mobile telephone is low.

17. The wristband-type informing device of claim 14, wherein the instruction signal contains information indicating that the mobile telephone is located outside a telephone service area, and the audio data contains an announcement indicating that the mobile telephone is located outside the telephone service area.

* * * * *